United States Patent
Kuenemund

(10) Patent No.: US 7,707,237 B2
(45) Date of Patent: Apr. 27, 2010

(54) MACROCELL AND METHOD FOR ADDING

(75) Inventor: Thomas Kuenemund, Munich (DE)

(73) Assignee: Infineon Technologies AG, Neubiberg (DE)

( * ) Notice: Subject to any disclaimer, the term of this patent is extended or adjusted under 35 U.S.C. 154(b) by 75 days.

(21) Appl. No.: 12/184,682

(22) Filed: Aug. 1, 2008

(65) Prior Publication Data

US 2010/0026341 A1    Feb. 4, 2010

(51) Int. Cl.
*G06F 7/52* (2006.01)
(52) U.S. Cl. .................. 708/630; 708/707; 708/708; 708/711; 326/39
(58) Field of Classification Search .............. 708/505, 708/670, 700, 707, 708, 710–712; 326/38–39
See application file for complete search history.

(56) References Cited

U.S. PATENT DOCUMENTS 5,808,926 A * 9/1998 Gorshtein et al. ........... 708/505
6,366,943 B1 * 4/2002 Clinton ...................... 708/551
6,708,190 B1 * 3/2004 Jones et al. ................. 708/230
6,836,147 B2 * 12/2004 Nakaya ....................... 326/39
6,915,323 B1 * 7/2005 Chang et al. ................ 708/707
6,990,508 B1 * 1/2006 Mohammed et al. ........ 708/700
7,003,545 B1 * 2/2006 Mohammed et al. ........ 708/711
7,157,934 B2 * 1/2007 Teifel et al. .................. 326/38
7,191,205 B2 * 3/2007 Nakaya ....................... 708/711

* cited by examiner

*Primary Examiner*—Vibol Tan
(74) *Attorney, Agent, or Firm*—Dickstein, Shapiro, LLP.

(57) ABSTRACT

A macrocell including an adder block with a plurality of bit-slice adders, a bypass path and a control unit adapted to receive a carry of a first neighboring macrocell, and to output a carry by generation within the adder block or by passage of the carry of the first neighboring macrocell through the bypass path to a second neighboring macrocell. The control unit is adapted to signal a validity of the carry output of the macrocell depending on a logical combination of states of the two carry output lines. The control unit is further adapted, depending on a validity signal of the first neighboring macrocell indicating a validity of the carry, to prevent forwarding the carry.

25 Claims, 12 Drawing Sheets

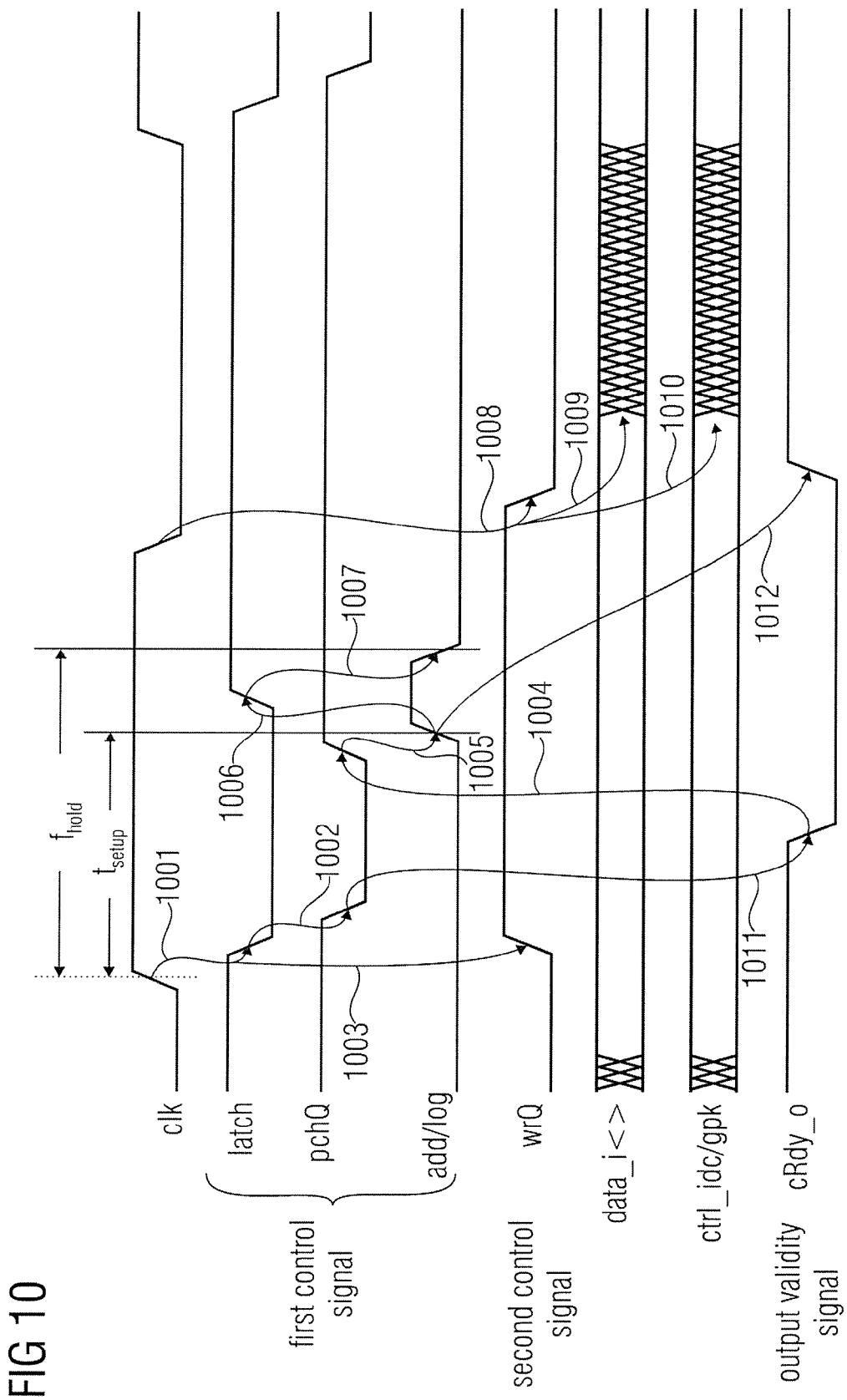

US 7,707,237 B2

MACROCELL AND METHOD FOR ADDING

BACKGROUND OF THE INVENTION

The invention relates to a macrocell and a method for adding. Macrocells can be used as functional units for processing data in, for example, microprocessors, controllers or co-processors. Macrocells can be used for building blocks like register files, multiplexers, arithmetic logic units (ALU) and shifters. A central processing unit (CPU) uses data paths for the interconnection of all functional units for processing data. Usual CPUs have data paths of a width of 8, 16 or 32 bits. In the field of crypto processors for public key cryptography calculating units for long number calculating are required. Crypto processors for public key cryptography, for example, may require arithmetic and logic units of a width of at least several hundred bits in order to enable the desired calculation speed in a range of milliseconds. This, in turn, poses a high effort in design, verification and layout of such units.

SUMMARY OF THE INVENTION

Embodiments of the invention provide a macrocell, comprising an adder block with a plurality of bit-slice adders corresponding to a sequence of consecutive significance bit positions of input values, a bypass path and a control unit adapted to receive a carry of a first neighboring macrocell associated with lower-significance bit positions in dual-rail coded form on two carry input lines and are configured to output a carry by generation within the adder block or by passage of the carry of the first neighboring macrocell through the bypass path to a second neighboring macrocell associated with higher-significance bit positions in dual-rail coded form on two carry output lines. The control unit is adapted to determine from data, depending on the input values of the adder block, whether the carry of the first neighboring macrocell may enable the bypass path to the second neighboring macrocell. The control unit is adapted to signal a validity of the carry output of the macrocell to the second neighboring macrocell depending on a logical combination of states of the two carry output lines. The control unit is further adapted, depending on a validity signal of the first neighboring macrocell indicating a validity of the carry of the first neighboring macrocell, to prevent forwarding the carry of the first neighboring macrocell to the bypass path and the adder block, respectively.

BRIEF DESCRIPTION OF THE DRAWINGS

FIG. 10 shows a timing diagram according to an embodiment of the invention.

DETAILED DESCRIPTION OF THE EMBODIMENTS

With reference to the accompanying FIGS. 1a-10, embodiments of a macrocell and a method for adding will be described.

Figure 1A:
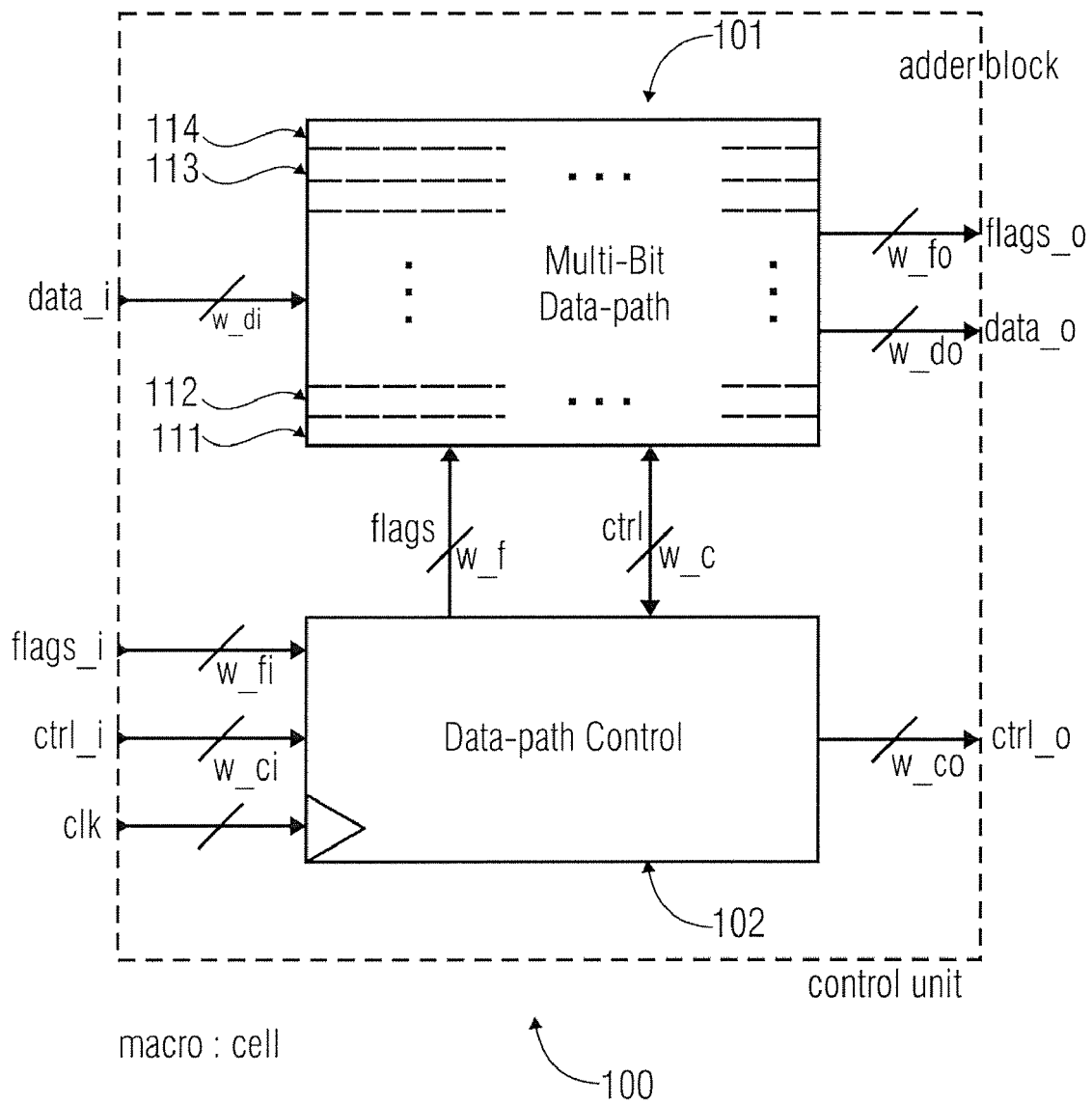
FIG. 1a shows a block diagram of a macrocell according to an embodiment of the invention.

FIG. 1a shows a block diagram of a macrocell according to an embodiment of the invention. The macrocell 100 comprises an adder block 101 or a multi-bit data path, respectively, and a control unit 102 or a data path control, respectively. The adder block 101 represents the actual data path (multi-bit data path). The adder block 101 has a first input to receive the w_di bit wide input values "data_i". The adder block 101 has a second input to receive w_f bit wide input flag signals "flags" for indicating carry bits. The adder block 101 has a third input to receive w_c bit wide internal control signals "ctrl". This third input is a bi-directional input that serves also as a first output for outputting the internal control signals "ctrl" to the control unit 102. The adder block 101 has a second output for outputting w_fo output flag signals "flags_o" on the output side for indicating carry bits. The adder block 101 has a third output for outputting w_do bit wide output values "data_o".

The control unit 102 has a first input for receiving w_fi bit wide input flag signals "flags_i for indicating carry bits. The control unit 102 has a second input for receiving w_ci bit wide input control signals "ctrl_i" including validity signals indicating validity of carry bits of macrocells associated with lower-significance bit positions and other signals, for example. The control unit 102 has a third input for receiving a common clock signal "clk". The control unit 102 has a fourth input for receiving the w_c bit wide internal control signals "ctrl" from the adder block 101. The control unit 102 has a first output for outputting the w_f bit wide internal flag signals "flag_s" to the adder block 101. The control unit 102 has a third output for outputting w_co bit wide output control signals "ctrl_o".

The adder block 101 comprises a plurality of bit-slice adders 111-114 corresponding to a sequence of consecutive significance bit positions of the input values "data_i". The adder block 101 is configured to provide the output values "data_o" and the output flag signals "flags_o" including carry values for a second neighboring macrocell associated with higher-significance bit positions.

The control unit 102 is configured to receive a carry of a first neighboring macrocell associated with lower-significance bit positions in dual-rail coded form on two carry input lines. The carry of the first neighboring macrocell may be included in the input flag signals "flags_i". The control unit 102 is further configured to output the carry after passage through the adder block 101 or a bypass path to the second neighboring macrocell associated with higher-significance bit positions in dual-rail coded form on two carry output lines. The carry may be included in the output flag signals "flags_o". The control unit 102 is configured to determine from data, depending on the input values "data_i" of the adder block 101, controlled by the internal control signals "ctrl", whether the carry of the first neighboring macrocell may pass a bypass path to the second neighboring macrocell. The bypass path may be included in the control unit 102 to bypass a carry when the control unit 102 has determined to bypass the carry, for example via the internal flag signals "flags" to the output flag signals "flags_o". The control unit 102 is configured to signal validity of the carry output of the macrocell to the second neighboring macrocell depending on a logical combination of bits of the two carry output lines, which has a dual-rail coded form. A validity signal may be included in the output flag signals "flags_o" or in the output control signals "ctrl_o", for example. The control unit 102 is further adapted, depending on a validity signal of the first neighboring macrocell, which may be included in the input flag signals "flags_i" or in the input control signals "ctrl_i", for example, indicating a validity of the carry of the first neighboring macrocell, to prevent forwarding the carry of the first neighboring macrocell to the bypass path and the adder block 101, respectively.

Figure 1B:
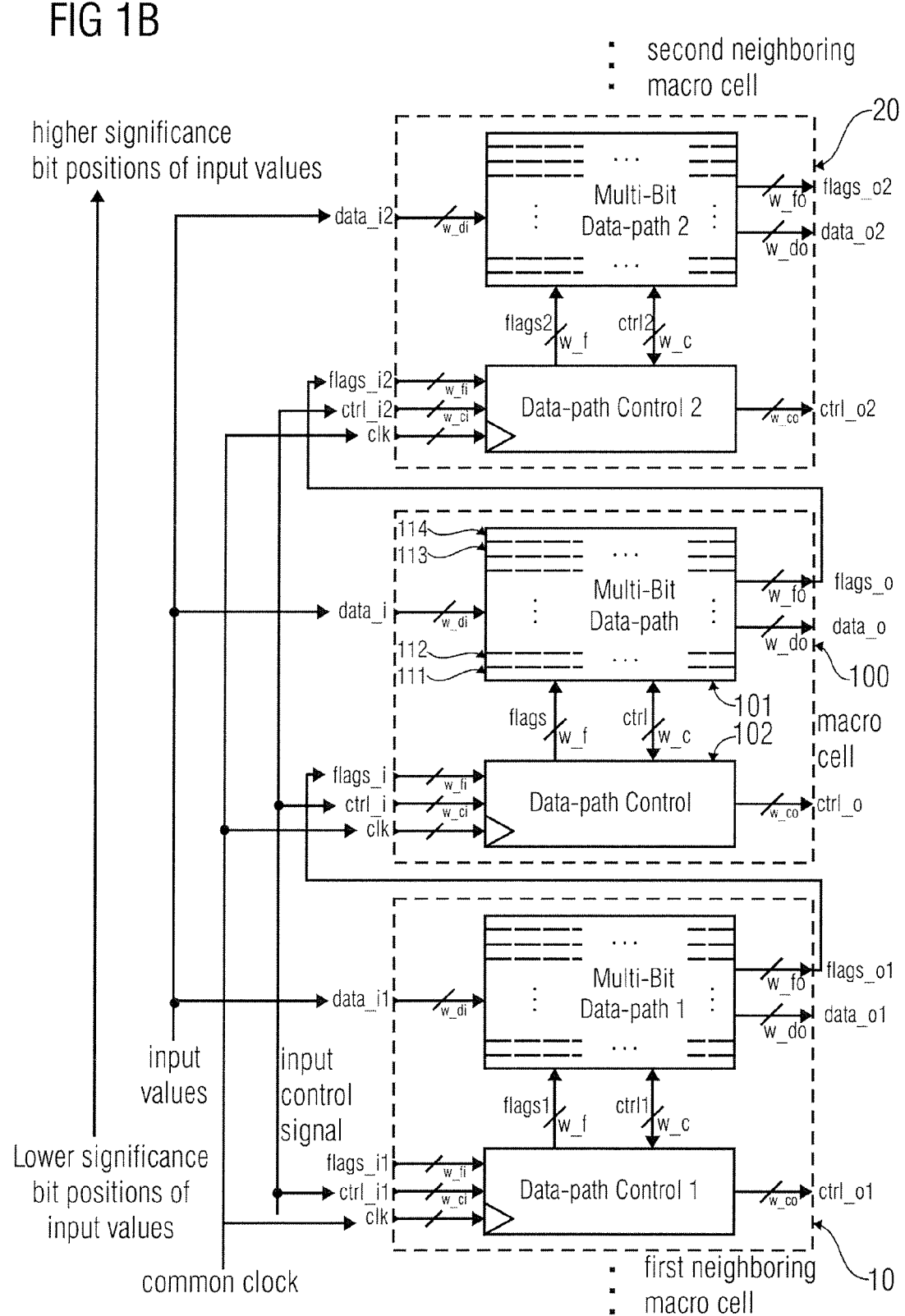
FIG. 1b shows a block diagram of three consecutive macrocells according to an embodiment of the invention.

FIG. 1b shows a block diagram of three consecutive macrocells according to an embodiment of the invention. A macrocell 100 according to an embodiment of the invention as described in FIG. 1a is coupled to a first neighboring macrocell 10 and coupled to a second neighboring macrocell 20. A common clock signal "clk" is provided to all three macrocells 10, 20, 100 to feed the macrocells 10, 20, 100 with the common clock signal "clk". The first neighboring macrocell 10 is associated with lower-significance bit positions of the input values "data_µl". The macrocell 100 is associated with (medium-significance) bit positions of the input values "data_i" and the second neighboring macrocell 20 is associated with higher-significance bit positions of the input values "data_i2". The input values range from low-significance input values "data_i1" via (medium significance) input values data_i to high-significance input values data_i2. The first neighboring macrocell 10 is fed with low-significance input control signals "ctrl_i1". The macrocell 100 is fed with (medium-significance) input control signals "ctrl_i" and the second neighboring macrocell is fed with high-significance input control signals "ctrl_i2". The first neighboring macrocell 10 provides the low-significance output values "data_o1". The macrocell 100 provides the (medium significance) output values "data_o" and the second neighboring macrocell 20 provides high-significance output values "data_o2". The first neighboring macrocell provides low-significance output control signals "ctrl_o1", the macrocell 100 provides (medium significance) output control signals "ctrl_o" and the second neighboring macrocell 20 provides high-significance output control signals "ctrl_o2". In this embodiment of the invention a carry of the first neighboring macrocell 10 is provided via the low-significance output flag signals "flags_o1" to the input flag signals "flags_i" of the macrocell 100. By a generation of the carry within the adder block 101 or by the passage of the carry through the bypass path of the macrocell 100, the carry output of the macrocell 100 is output at the output flag signals "flags_o" of the macrocell 100. The bypassed carry from the first neighboring macrocell 10 or the carry being generated within the macrocell 100 and being output at the output flag signals "flags_o", respectively, is forwarded to the second neighboring macrocell 20 which receives the carry via the high-significance input flag signals "flags_i2". Depending on a generation within the adder block or the passage through the bypass path of the second neighboring macrocell 20, the carry is output at the high-significance output flag signals "flags_o2".

The first neighboring macrocell 10 has an input for receiving low-significance input flag signals "flags_i1" which may come from a preceding macrocell associated with still lower bit positions of input values or that may come from another logic device providing carry signals in dual-rail coded form. The internal communication between the control unit 102 and the adder block 101 of the three macrocells 10, 20, 100 corresponds to the embodiment of the invention as described in FIG. 1a.

Embodiments of the invention provide arithmetic logic macrocells for arithmetic and logic units having a large data path width with the effect of an optimum combination of the respective advantages of the two different classical implementation approaches "semi-custom (SC)" and "full-custom (FC)". Semi-custom implementation designs, for example, may use predefined cells, e.g. AND or NOR cells described by VHDL language. The design may be an automatic design process, taking different cells, interconnecting the cells and checking the time behavior of the resulting circuit. In contrast to the full-custom design, the semi-custom design usually requires a higher number of transistors. As a standard for a complete and low-effort description and timing analysis a semi-custom design requires all inputs to be connected to a gate terminal of one of the transistors the circuit is designed of (if one of the inputs of the circuit were connected to a source or drain terminal of one of the transistors, the timing analysis of the circuit would be very difficult as the source or drain terminals would rely on other parameters influencing the timing analysis and making calculations very difficult, especially for a large number of transistors).

Designing arithmetic logic macrocells for arithmetic and logic units having a large data path width, for example for crypto processors, requires the combination of a large number of macrocells, each of the macrocells comprising e.g. 50 transistors, for example. Realizing a circuit as illustrated in FIG. 1b within a semi-custom design requires a timing analysis of the whole carry path from low-significance input flag signals "flags_i1" via input flag signals "flags_i" to high-significance output flag signals "flags_o2". By embodiments of the invention corresponding to FIG. 1b, the carry path can be separated into three sections, the first section described by the first neighboring macrocell 10, the second section described by the macrocell 100 and the third section described by the second neighboring macrocell 20. An input/output timing analysis of signals can be reduced to three independent timing analysis steps by analyzing the timing behavior of the first neighboring macrocell 10, the macrocell 100 and the second neighboring macrocell 20, instead of analyzing the whole circuit including all three macrocells 10, 20, 100.

Embodiments of the invention provide a concept of tuned asynchronous self-clocking within individual macrocells and macrocells interacting with one another. By this concept it is possible to integrate substantially asynchronous parts of the data path, e.g. the carry path, running across several macrocells completely into the synchronous semi-custom design flow, so that all advantages of the semi-custom design automation are fully maintained, i.e. all elements of the chain of semi-custom design tools, like Design Compiler, Place & Route, Static Timing Analysis, for example, also have complete control over those asynchronous full-custom parts of the data path.

On the other hand, the advantages of a full-custom implementation are maintained, too: significantly smaller area, substantially lower energy consumption and higher processing speed as compared to the classical semi-custom implementation.

In addition to that, by a suitable selection of the physical size of a macrocell, e.g. 4 bits each of a 32 bit wide data path in a macrocell, or 48 bits each of a 288 bit wide data path in a macrocell, as realized, for example, for crypto processors, its mastery may be guaranteed with little effort, i.e. the reliable and complete prediction of the correct function within the specified regions of supply voltage, temperature, frequency, etc., on the basis of simulations may be done with little effort. Embodiments of the invention provide arithmetic logic units (ALU) in CPUs and/or co-processors on microcontroller ICs.

Using a circuit as illustrated in FIG. 1b without separation of the circuit into the three macrocells 10, 20, 100 and without an individual analysis of the three macrocells would result in disadvantages, e.g. either a bigger chip area and higher energy consumption and a relatively low processing speed in the case of the semi-custom solution or a smaller degree of design automation in the case of the full-custom solution and a higher risk regarding mastery, e.g. the reliable and complete prediction of the correct function within the specified areas, for example of supply voltage, temperature, frequency, etc., on the basis of simulations: For big full-custom macros, very much time and effort for their functional and physical characterization, for their integration into the design flow, and for their testability would be required.

The control unit 102 is adapted to signal validity of the carry of the macrocell 100 to the second neighboring macrocell 20 depending on a logical combination of the state of the two carry output lines, for example provided at the output flag signals flags_o. The same behavior is valid for the first neighboring macrocell, so that the control unit 102 of the macrocell 100 is configured, depending on a validity signal of the first neighboring macrocell 10 indicating a validity of the carry output of the macrocell 100, to prevent forwarding the carry of the first neighboring macrocell 10 to the bypass path and the adder block of the macrocell 100, respectively. By this behavior of embodiments of the invention, the macrocells 10, 20, 100 inhibit forwarding the carry when the state of the carry provided at the two carry output lines is not valid. This behavior can be described as an asynchronous inter- and intra-macrocell self-clocking. This self-clocking is nevertheless compatible with the semi-custom flow, and a substantial part of the advantages regarding silicon area, processing time and energy consumption as well as mastery and design efforts results from this.

The control unit 102 is configured to output the carry in dual-rail coded form on two carry output lines, for example included in the output flag signals "flags_o" according to FIG. 1b. Dual-rail logic, also referred to as complementary logic or one-hot logic, represents each bit by two nodes b and bq, wherein this bit comprises a valid logical value when b corresponds to the true logical value of this bit and bq to the negated value of this bit (in contrast to the conventional single-rail logic, wherein each bit within a data or signal path is physically represented by exactly one electric node of a switching network or a switching/control unit). Dual-rail logic may provide a desired freedom of spikes or glitches based on runtime differences. This behavior is achieved by inserting a precharge state between two consecutive logically valid states, for example (1, 0) or (0, 1), wherein for the precharge state both b and also bq are charged to the same electrical potential, i.e. take on invalid logical values (1, 1) or (0, 0).

After all intermediate calculations are performed (glitches are decayed) b and bq assume valid logical values that may be connected to further processing nodes.

Embodiments of the invention provide a macrocell 100, comprising an adder block 101, which comprises a plurality of bit-slice adders 111-114 corresponding to a sequence of consecutive significance bit positions of input values "data_i", the bit-slice adders 111-114 being configured to, depending on one of the input values "data_i" or intermediate values depending thereon, and a carry of a first neighboring macrocell associated with lower-significance bit positions as processed by bit-slice adders 111-114 corresponding to lower-significance bit positions during generation of the carry of the first neighboring macrocell 10 within the adder block 101, process the carry of the first neighboring macrocell 10 and determine output values "data_o" and to latch one of the input values "data_i" or the intermediate values depending thereon responsive to a first control signal. The first control signal is included in the internal control signals "ctrl". The macrocell 100 further comprises a bypass path and a control unit 102 being configured to receive the carry of the first neighboring macrocell 10 in dual-rail coded form on two carry input lines which is included in the input flag signals "flags_i", and to output a carry by generation within the adder block 101, or by passage through the bypass path, to a second neighboring macrocell 20 associated with higher-significance bit positions in dual-rail coded form on two carry output lines which is included in the output flag signals "flags_o" and to determine from data depending on the input values "data_i" of the adder block 101, whether the carry of the first neighboring macrocell 10 may pass the bypass path to the second neighboring macrocell 20. The control unit 102 is further configured to enable the first control signal, which is included in the internal control signals "ctrl", in a predetermined timing relative to a clock signal "clk", so that the carry output of the first neighboring macrocell 10 is forwarded to the adder block 101 during the enable phase of the first control signal.

Embodiments of the invention latching intermediate values depending on the input values "data_i", the intermediate values being, for example, carry generate, carry propagate and carry kill signals as described in the following sections (FIG. 3, FIG. 4), show significant advantages over classical semi and full-custom approaches latching only the input values "data_i". By embodiments of the invention latching the intermediate values, the data path is only clocked at the location where the transition from single to dual-rail implementation enables the best possible advantages regarding silicon area, processing time and energy consumption. On the one hand, due to many parallel influences of all bit slices, a carry path without dual-rail implementation would mean a very high number of unwanted glitches or spikes, i.e. short-time signal value transitions based on runtime differences, which would in turn make the energy consumption rise dramatically. On the other hand such glitches in the first single-rail part of the data path contribute substantially less to area and energy consumption than a dual-rail implementation would do with the then necessary registers for data and control inputs. In addition, the single-rail implementation does not only allow minimum transistor numbers but also minimum transistor dimensions. Moreover, a voltage supply "VDD" for this first single-rail part of the data path could also be switched off, e.g. by setting "clk", the common clock signal, to zero to suppress the still remaining glitches as far as possible. The latter measure may also be important for ICs which may only feature a very low leakage current in a SLEEP, IDLE or STANDBY mode.

The freedom of glitches not only applies to the carry path, but, because of the self-clocked macrocell, also to the output values data_o of the macrocell 100, which substantially reduces the energy consumption of all following circuits.

Figure 2:
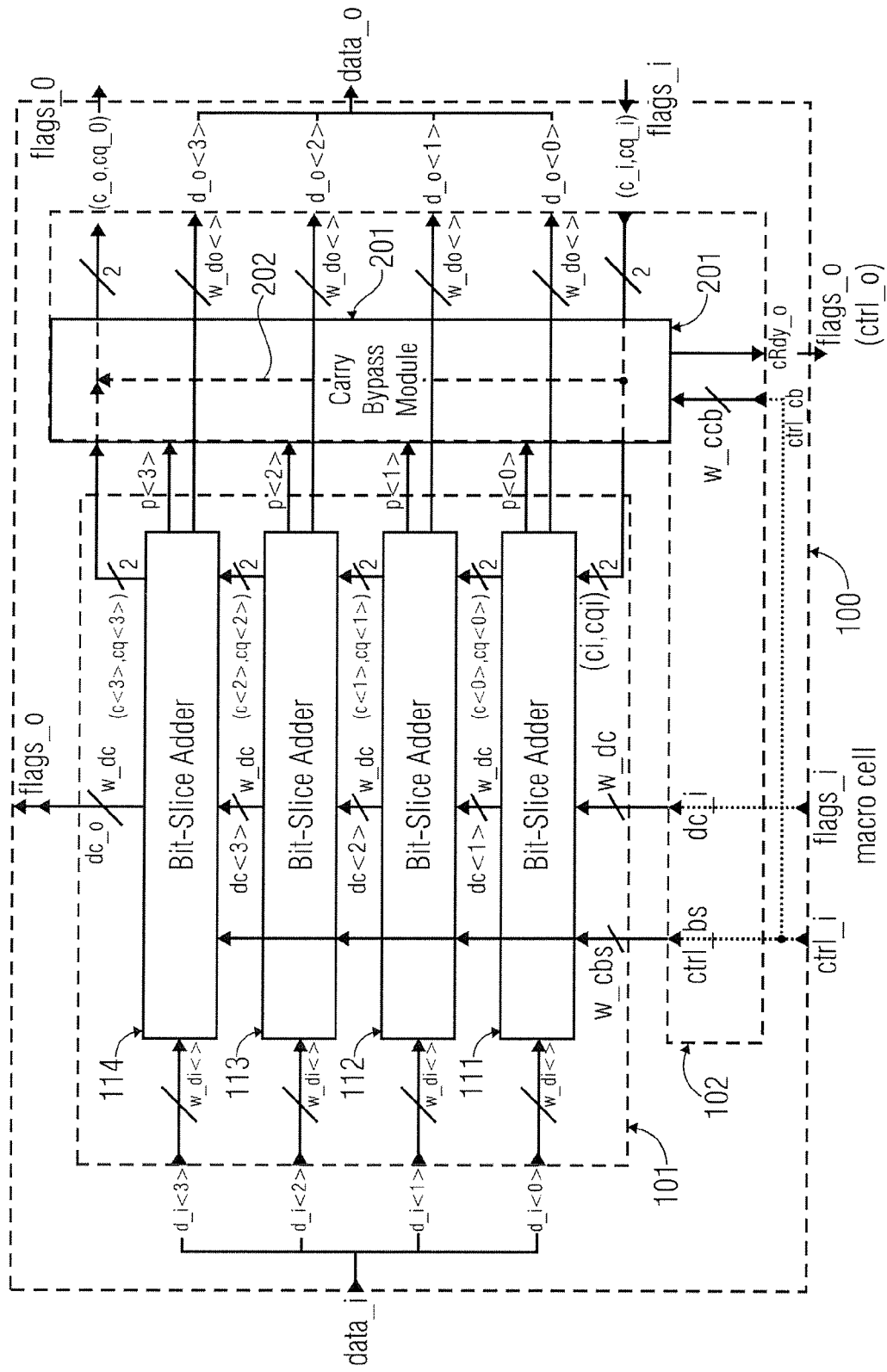
FIG. 2 shows a block diagram of a macrocell with an adder block and a control unit according to an embodiment of the invention.

FIG. 2 shows a macrocell 100 with an adder block 101 and a control unit 102 according to an embodiment of the invention. The macrocell 100 comprises an adder block 101 and a control unit 102. The adder block 101 comprises four bit-slice adders 111-114. The control unit 102 comprises a carry bypass module 201 which comprises a bypass path 202. The embodiment of the invention depicted in FIG. 2 is an example for the partial circuit "adder block" 101 of FIG. 1a/b. It shows a four bit wide data path comprising four bit-slice adders 111-114 for calculating the w_do bit wide output values "data_o (a first output value d_o<0>, a second output value d_o<1>, a third output value d_o<2> and a fourth output value d_o<3>), from the w_di bit wide input values "data_i" (a first input value d_i<0>, a second input value d_i<1>, a third input value d_i<2> and a fourth input value d_i<3>), and it shows a carry bypass module 201. The first, second, third and fourth input values d_i<λ>, λ=0-3, correspond to the input values "data_i" as shown in FIGS. 1a and 1b. The first, second, third and fourth output values d_o<λ>, λ=0-3, correspond to the output values "data_o" depicted in FIGS. 1a and 1b.

The control unit 102 is adapted to control the four bit-slice adders 111-114 via a w_cbs bit wide bit-slice control signal "ctrl_bs" and is adapted to control the carry bypass module 201 via a w_ccb bit wide carry bypass control signal "ctrl_cb". The bit-slice control signal "ctrl_bs" and the carry bypass control signal "ctrl_cb" may be provided by or derived from the input control signals "ctrl_i" as depicted in FIGS. 1a and 1b. The control unit 102 is configured to provide additional carry input values "dc_i" to the first bit-slice adder 111 associated with the first input value d_i<0>, associated with least significant bits of the input values "data_i". The w_dc bit wide additional carry input values "dc_i" may be provided by the input flag signals "flags_i" corresponding to the macrocell 100 as depicted in FIGS. 1a and 1b. The first bit-slice adder 111 provides w_dc bit wide first additional carry values dc_<1> to the second bit-slice adder 112. The second bit-slice adder 112 provides w_dc bit wide second additional carry values dc_<2> to the third bit-slice adder 113. The third bit-slice adder 113 provides w_dc bit wide third additional carry values dc_<3> to the fourth bit-slice adder 114. The fourth bit-slice adder 114 provides w_dc bit wide additional carry output values dc_o at an output of the macrocell 100 which may be provided to the output flag signals "flags_o" corresponding to embodiments of the invention as depicted in FIGS. 1a or 1b. The control unit 102 provides a validity signal "cRdy_o" at an output of the macrocell 100 which may be provided to the output flag signals "flags_o" or alternatively to the output control signals "ctrl_o" corresponding to embodiments of the invention depicted in FIGS. 1a and 1b.

The control unit 102 is adapted to receive a carry of the first neighboring macrocell 10 having a first rail part c_i and a second rail part cq_i. The carry output from the first neighboring macrocell 10 may be included in the input flag signals "flags_i". The first rail part c_i and the second rail part cq_i of the carry from the first neighboring macrocell 10 have a width of 1 bit. The carry from the first neighboring macrocell 10 is a dual-rail coded signal. The control unit 102 is further configured to provide a carry to the second neighboring macrocell 20 having a first rail part c_o and a second rail part cq_o at an output of the macrocell 100. The carry to the second neighboring macrocell (c_o, cq_o) is a dual-rail coded signal provided at two carry output lines which may be included in the output flag signals "flags_o" corresponding to embodiments of the invention as depicted in FIGS. 1a and 1b.

The control unit 102 is further adapted to provide the two bit wide carry input with the first rail part c_i and the second rail part cq_i to the first bit-slice adder 111. The first bit-slice adder 111 is configured to provide a two bit wide first carry having a first rail part c<0> and a second rail part cq<0> to the second bit-slice adder 112. The second bit-slice adder 112 is configured to provide a two bit wide second carry having a first rail part c<1> and a second rail part cq<1> to the third bit-slice adder 113. The third bit-slice adder 113 is configured to provide a two bit wide third carry having a first rail part c<2> and a second rail part cq<2> to the fourth bit-slice adder 114. The fourth bit-slice adder 114 is adapted to provide a two bit wide carry output having a first rail part c<3> and a second rail part cq<3> to the control unit 102. The first bit-slice adder 111 is configured to provide a first Propagate-signal p<0> to the control unit 102. The second bit-slice adder 112 is configured to provide a second Propagate-signal p<1> to the control unit 102. The third bit-slice adder 113 is configured to provide a third Propagate-signal p<2> to the control unit 102. The fourth bit-slice adder 114 is configured to provide a fourth Propagate-signal p<3> to the control unit 102. All four Propagate-signals have a bit width of 1 bit.

The carry bypass module 201 comprises a bypass path 202 for bypassing the carry from the first neighboring macrocell (c_i, cq_i) to the carry to the second neighboring macrocell (c_o, cq_o). At any rate the carry of the first neighboring macrocell (c_i, cq_i) will enter the adder block 101 via its carry input (c_i, cq_i) and will be processed within the adder block 101 in order to compute the data outputs d_o<3:0> and the carry output (c_o, cq_o) to the second neighboring macrocell 20.

A bit-slice adder 111-114 may be a 1 bit full adder, as needed, i.e. an adder which receives two data input bits as well as a carry from a neighboring less significant bit-slice and which outputs a sum bit as well as a carry for a neighboring more significant bit-slice. Alternatively, the bit-slice adders 111-114 can also correspond to bit-slice ALUs for processing input values. All bit-slice adders 111-114 have the property that they provide a carry bit to the neighboring more significant bit-slice, that they provide a sum bit and that they receive a carry from the neighboring less-significant bit-slice. The adder block 101 can internally have an arbitrary combination of calculation units, for example configured as a simple ripple carry adder.

A macrocell may correspond to a three-operands ALU, for example a three-operands adder, for processing three input values. The three-operands ALU may comprise an ALU block with a plurality of bit-slice ALUs.

The bit-slice ALUs may comprise, for example, a three bit format converter, e.g. a half adder, which is configured, depending on three input bits associated with a respective one of the significance bit positions, to calculate a format converter output bit and an additional carry bit, the additional carry bit being input to a bit-slice ALU corresponding to next higher-significance bit positions of the three input values.

The bit-slice ALUs may, for example further comprise a two bits full adder being adapted, depending on the format converter output bit or intermediate bits depending thereon, depending on an additional carry bit associated with a bit-slice ALU corresponding to next lower-significance bit position of the three input values and depending on a carry of a first neighboring three-operands ALU associated with lower-significance bit positions as processed by bit-slice ALUs corresponding to lower-significance bit positions of the ALU block, to process the carry of the first neighboring three-operands ALU and to determine a three-operands ALU output bit and to latch the format converter output bit or the intermediate bits depending thereon responsive to the first control signal. The first control signal is included in the internal control signals "ctrl".

Although bit-slice adders 111-114 are depicted in FIG. 2, it is noted that instead of bit-slice adders bit-slice ALUs (Arithmetic-Logic Units) may be used which are able to perform adding and additional logical and/or arithmetical operations. For example, such bit-slice ALUs may be configured to arithmetically-logically process the output values "data_o" from the input values "data_i", wherein the "arithmetic-logic processing" corresponds to an "adding". An adder block 101 is an embodiment of an ALU block comprising a plurality of bit-slice ALUs.

In the embodiment as depicted in FIG. 2 an adder block 101 comprises a number of "four" bit-slice adders 111-114 in order to simplify the corresponding figures. Other embodiments of the invention may comprise different numbers. Another embodiment, for example, may comprise an ALU block comprising 48 bit-slice ALUs for processing the output values "data_o" from the input values "data_i". The corresponding carry bypass module would then be configured to process carries associated with the 48 bit-slice ALUs.

Figure 3:
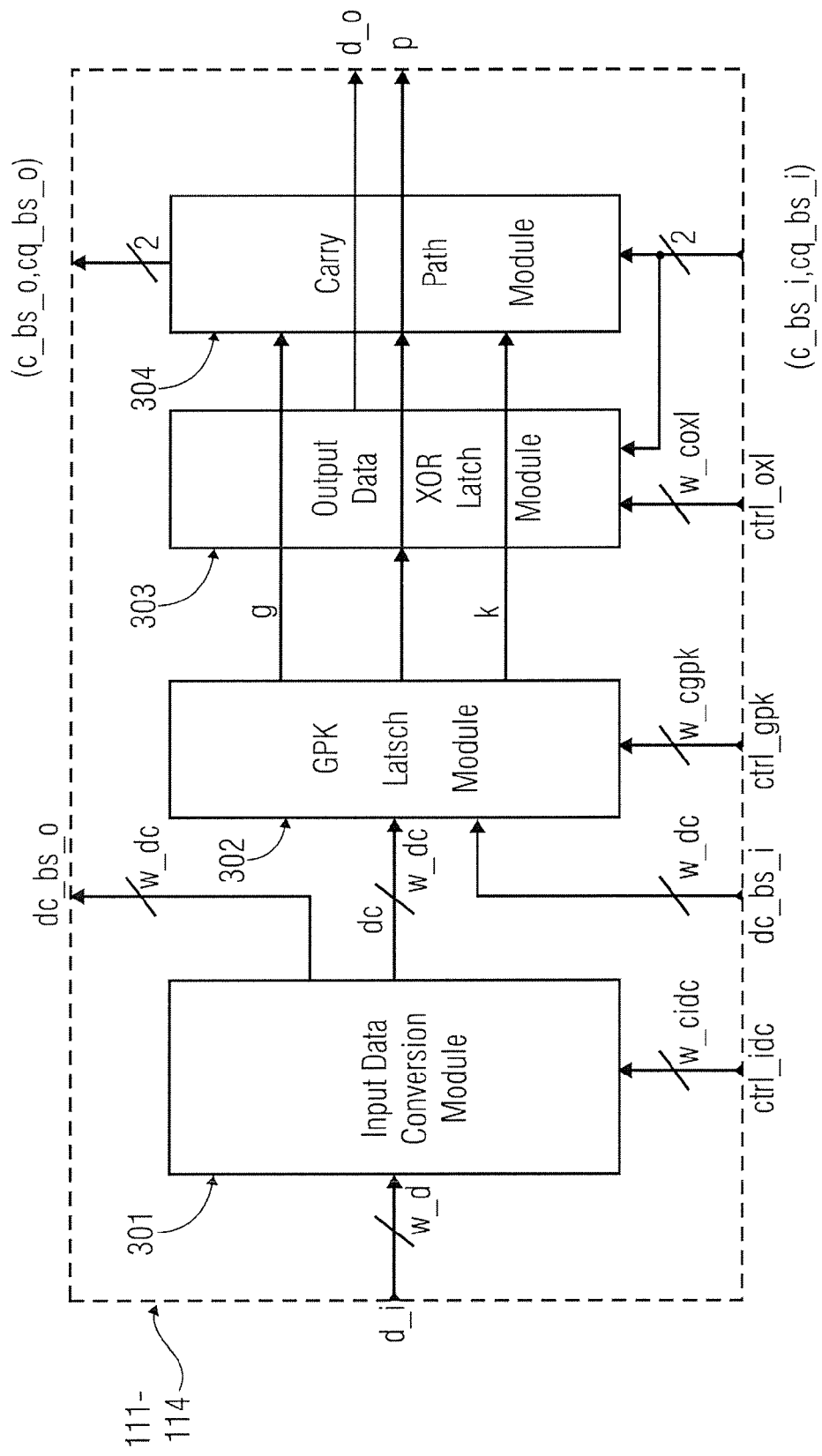
FIG. 3 shows a block diagram of a bit-slice adder according to an embodiment of the invention.

FIG. 3 shows a block diagram of a bit-slice adder 111-114 according to an embodiment of the invention. The bit-slice adder corresponds to one of the bit-slice adders 111-114 as depicted in FIG. 2. The bit-slice adder 111-114 comprises an input data conversion module 301, a GPK latch module 302, an output data XOR latch module 303 and a carry path module 304. The input data conversion module 301 has a first input providing a w_d bit wide bit-slice input value di which may correspond to one of the input values, i.e. the first input value $d\_i<0>$, the second input value $d\_i<1>$, the third input value $d\_i<2>$ or the fourth input value $d\_i<3>$ as depicted in FIG. 2. The input data conversion module 301 has a second input for receiving a w_cidc bit wide third control signal "ctrl_idc" (or IDC control signal, respectively) which may be included in the bit-slice control signal "ctrl_bs" as depicted in FIG. 2. The input data conversion module 301 has a first output providing a w_dc bit wide additional bit-slice carry output value "dc_bs_o" which may correspond to one of the additional carry values depicted in FIG. 2, for example to the first additional carry values $dc\_<1>$, the second additional carry values $dc\_<2>$, the third additional carry values $dc\_<3>$ or the additional carry output values dc_o.

The input data conversion module 301 has a second output providing a w_dc bit wide converted bit-slice input value "dc" to the GPK latch module 302 as the first input of this module. The GPK latch module 302 has a second input receiving a w_dc bit wide additional bit-slice carry input value "dc_bs_i" which may correspond to one of the additional carry values depicted in FIG. 2, for example to the additional carry input values dc_i, to the first additional carry values $dc\_<1>$, to the second additional carry values $dc\_<2>$ or to the third additional carry values $dc\_<3>$. The GPK latch module 302 has a third input receiving a w_cgpk bit wide first control signal "ctrl_gpk" which may be included in the bit-slice control signal "ctrl_bs" as depicted in FIG. 2. The GPK latch module 302 has a first output providing a 1 bit wide Generate-signal g, a second output for providing a 1 bit wide Propagate-signal p and a third output for providing a 1 bit wide Kill-signal k. The Generate-signal g and the Kill-signal k are provided to the carry path module 304 as well as the Kill-signal k, while the Propagate-signal p is provided to the output data XOR latch module 303, to the carry path module 304 and to an output of the bit-slice adder 111-114. The Propagate-signal p provided at the output of the bit-slice adder 111-114 may correspond to the Propagate-signals depicted in FIG. 2, for example to the first Propagate-signal $p<0>$, to the second Propagate-signal $p<1>$, to the third Propagate-signal $p<2>$ or to the fourth Propagate-signal $p<3>$.

The Propagate-signal p is provided to a first input of the output data XOR latch module 303. The output data XOR latch module 303 has a second input receiving a w_coxl bit wide second control signal "ctrl_oxl" or OXL control signal, respectively, which may be included in the bit-slice control signal "ctrl_bs" depicted in FIG. 2. The output data XOR latch module 303 has a third input receiving a 2 bit wide bit-slice input carry having a first rail part "c_bs_i" and a second rail part "cq_bs_i" which corresponds to one of the carries depicted in FIG. 2, i.e. the carry input (c_i, cq_i), the first carry ($c<0>$, $cq<0>$), the second carry ($c<1>$, $cq<1>$) or the third carry ($c<2>$, $cq<2>$). The output data XOR latch module 303 has an output providing a 1 bit wide bit-slice output value d_o which corresponds to one of the output values depicted in FIG. 2, for example to the first output value $d\_o<0>$, to the second output value $d\_o<1>$, to the third output value $d\_o<2>$ or to the fourth output value $d\_o<3>$.

The carry path module 304 has three inputs for receiving the 1 bit wide GPK-signals g, p, k and a fourth input for receiving the 2 bit wide bit-slice input carry (c_bs_i, cq_bs_i) which is also received by the output data XOR latch module 303. The carry path module 304 has an output for providing the 2 bit wide bit-slice output carry having a first rail part c_bs_o and a second rail part cq_bs_o which corresponds to one of the carries depicted in FIG. 2, for example the first carry ($c<0>$, $cq<0>$), the second carry ($c<1>$, $cq<1>$), the third carry ($c<2>$, $cq<2>$) or the carry output ($c<3>$, $cq<3>$).

The GPK-signals g, p, k are log/add parameters, for example of a 2 bits full adder. The log/add parameter p, also referred to as "propagate", designates the case where exactly one bit of two bits to be added equals 1 (g,p,k)=(0,1,0). In this case a carry coming from the first neighboring macrocell 10 is simply passed on and propagates. If, however, both input bits in one bit slice are equal to 1, this bit slice generates a new carry, also referred to as "generate" (g,p,k)=(1,0,0). If, on the other hand, both input bits are equal to 0, a carry which may possibly enter into the bit slice will be absorbed by the currently considered bit slice, i.e. the carry is killed, therefore the log/add parameter k is also referred to as "kill" (g,p,k)=(0,0, 1). As only either p, k or g have a logical state of 1, only one of the GPK-signals g, p, k have a logical state of 1 at the same time. The GPK-signals together represent a one-hot coding.

The input data conversion module 301 is adapted for the conversion and/or modification of the bit-slice input value "d_i" depending on the third control signal "ctrl_idc", e.g. for operations like multiplexing, shifting, data format conversion to the converted bit-slice input value "dc" and the additional bit-slice carry output value "dc_bs_o", wherein the additional bit-slice carry output value "dc_bs-o" represents carry data for the neighboring more significant bit-slice. The GPK latch module 302 is adapted to generate, depending on the first control signal "ctrl_gpk", from the converted bit-slice input value "dc" and the additional bit-slice carry input value "dc_bs_i" "which includes the carry data from the neighboring less significant bit-slice, the so-called "carry-generate", "carry-propagate" and "carry-kill" signals g, p and k or GPK-signals, respectively, and to store the latter for the duration of the following complete carry-ripple and/or carry-bypass process.

The output data XOR latch module 303 is adapted to calculate, depending on the OXL control signal "ctrl_oxl", the bit-slice output value "d_o" from the carry-propagate signal p and the dual-rail bit-slice input carry (c_bs_i, cq_bs_i) and to store "d_o".

The carry path module 304 is adapted to determine the bit-slice output carry (c_bs_o, cq_bs_o) from the bit-slice input carry (c_bs_i, cq_bs_i) and the GPK-signals g, p, k.

Figure 4:
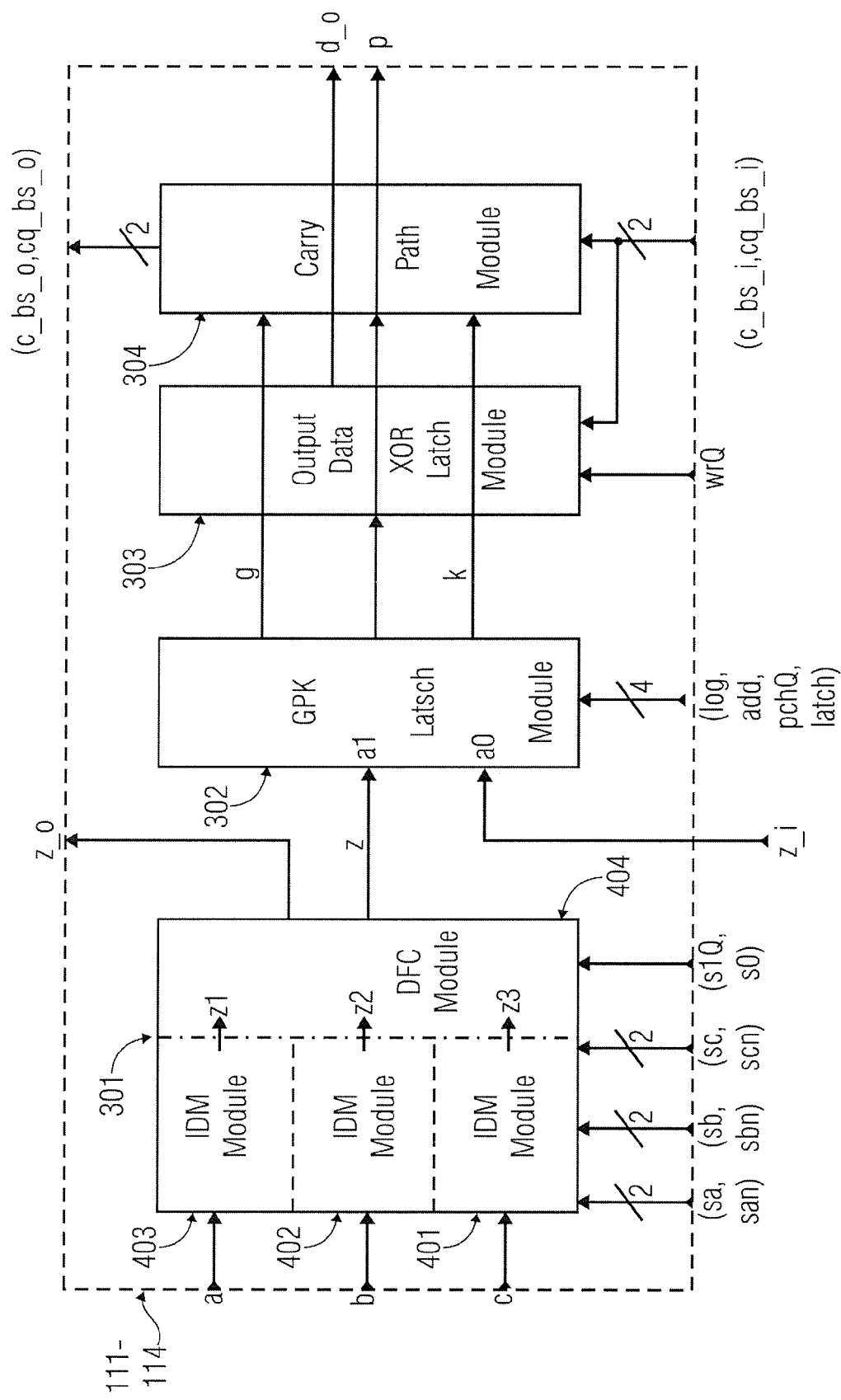
FIG. 4 shows a block diagram of a bit-slice adder according to another embodiment of the invention.

FIG. 4 is a block diagram of a bit-slice adder according to another embodiment of the invention. The bit-slice adder 111-114 corresponds to one of the bit-slice adders as depicted in FIG. 2 or FIG. 3. The bit-slice adder 111-114 comprises an input data conversion module 301, a GPK latch module 302, an output data XOR latch module 303 and a carry path module 304. The input data conversion module comprises three IDM modules (IDM=input data multiplexing), a first IDM module 401, a second IDM module 402 and a third IDM module 403. The input data conversion module 301 further comprises a DFC module (DFC=data format conversion) 404. The first IDM module 401 has an input for receiving a first bit-slice input value "c". The second IDM module 402 has an input for receiving a second bit-slice input value "b". The third IDM module 403 has an input for receiving a third bit-slice input value "a". The three bit-slice input values c, b, a correspond to the bit-slice input value di as depicted in FIG. 3 or to one of the input values $d\_i<0>$, $d\_i<1>$, $d\_i<2>$, $d\_i<3>$ as depicted in FIG. 2, respectively. Each of the IDM modules 401-403 provide an IDM output value, the first IDM module 401 providing a first IDM output value z1, the second IDM module 402 providing a second IDM output value z2 and the third IDM module 403 providing a third IDM output value z3. Each of the three IDM output values z1, z2, z3 is provided to the DFC module 404. The three bit-slice input values c, b, a as well as the three IDM output values z1, z2, z3 are 1 bit wide signals.

The input data conversion module 301 has four 2 bit wide further inputs for receiving a third control signal having a first signal component "sc", a second signal component "scn", a third signal component "sb", a fourth signal component "sbn", a fifth signal component "sa", a sixth signal component "san", a seventh signal component "s1Q" and an eighth signal component "s0". The signal components "sa", "san", "sb", "sbn", "sc", "scn" are input signals for a respective IDM module 403, 402, 401. The signal components "s1Q" and "s0" are input signals to the DFC module 404. The third control signal "(sa, san), (sb, sbn), (sc, scn), (s1Q, s0)" may correspond to the third control signal "ctrl_idc" as depicted in FIG. 3.

The DFC module 404 has three inputs for receiving the three IDM output values z1, z2, z3, one further input for receiving the seventh and eighth signal components "s1Q", "s0" of the third control signal and provides two outputs that are also outputs of the input data conversion module 301. One output provides a 1 bit wide converted bit-slice input value z that may correspond to the converted bit-slice input value "dc" as depicted in FIG. 3. The converted bit-slice input value z is provided to the GPK latch module 302. The second output of the DFC module 404 or the input data conversion module 301, respectively, provides an additional 1 bit wide bit-slice output carry value z_o that is also an output of the bit-slice adder 111-114 and may correspond to the additional bit-slice carry output value "dc_bs_o" as depicted in FIG. 3.

The GPK latch module 302 has a first input for receiving a first GPK input value a0 that corresponds to the additional bit-slice carry input value z_i which is an input to the bit-slice adder 111-114 and may correspond to the additional bit-slice carry input value "dc_bs_i" as depicted in FIG. 3. The GPK module 302 has a second input for receiving a second GPK input value a1 that corresponds to the converted bit-slice input value z from an output of the DFC module 404 which may correspond to the converted bit-slice input value "dc" as depicted in FIG. 3. The first GPK input value a0 and the second GPK input value are 1 bit wide input values. The GPK latch module 302 has a third input for receiving a 4 bit wide first control signal with a log signal component "log", an add signal component "add", a precharge signal component "pchQ" and a latch signal component "latch". The first control signal (log, add, pchQ, latch) may correspond to the first control signal ctrl_gpk as depicted in FIG. 3. As well as the log signal component "log", the add signal component "add", the precharge signal component "pchQ" and the "latch" signal component latch are 1 bit wide signals. The GPK latch module 302 is adapted to provide the GPK-signals g, p, k at three outputs corresponding to the GPK-signals depicted in FIG. 3.

In embodiments of the invention signals denoted with a capital "Q" or small "q" as the last sign of the signal specifier describe low active signals while signals not ending with a capital "Q" or small "q", respectively, describe high active signals.

The output data XOR latch module 303 has an input for receiving the Propagate-signal p from the GPK latch module 302 and a second input for receiving a 1 bit wide second control signal wrQ which may correspond to the second control signal ctrl_oxl or OXL control signal, respectively, as depicted in FIG. 3. The output data XOR latch module 303 has a third input for receiving the bit-slice input carry value with the first rail part "c_bs_i" and the second rail part "cq_bs_i" which corresponds to the bit-slice input carry value (c_bs_i, cq_bs_i) as depicted in FIG. 3. The output data XOR latch module 303 is configured to provide a bit-slice output value "d_o" at an output that is also the output of the bit-slice adder 111-114 and which corresponds to the bit-slice output value "d_o" as depicted in FIG. 3.

The carry path module 304 corresponds to the carry path module 304 as depicted in FIG. 3. The carry path module 304 has three inputs for receiving the GPK-signals g, p, k and a further input for receiving the bit-slice input carry value (c_bs_i, cq_bs_i) which is also an input of the bit-slice adder 111-114. The carry path module 304 has an output for providing the bit-slice output carry value (c_bs_o, cq_bs_o) that is also an output of the bit-slice adder 111-114.

The bit-slice adder 111-114 according to the embodiment of the invention as depicted in FIG. 4 is an example for the setup of a bit-slice adder according to an embodiment of the invention as depicted in FIG. 3, wherein the input data conversion module 301 comprises three IDM modules 401-403 and a DFC module 404. In contrast to the embodiment of the invention depicted in FIG. 3, the example bit-slice adder as depicted in FIG. 4 comprises 1 bit wide single-rail signals for input, output and internal values and 2 bit wide dual-rail signals for input and output carries.

Figure 5A:
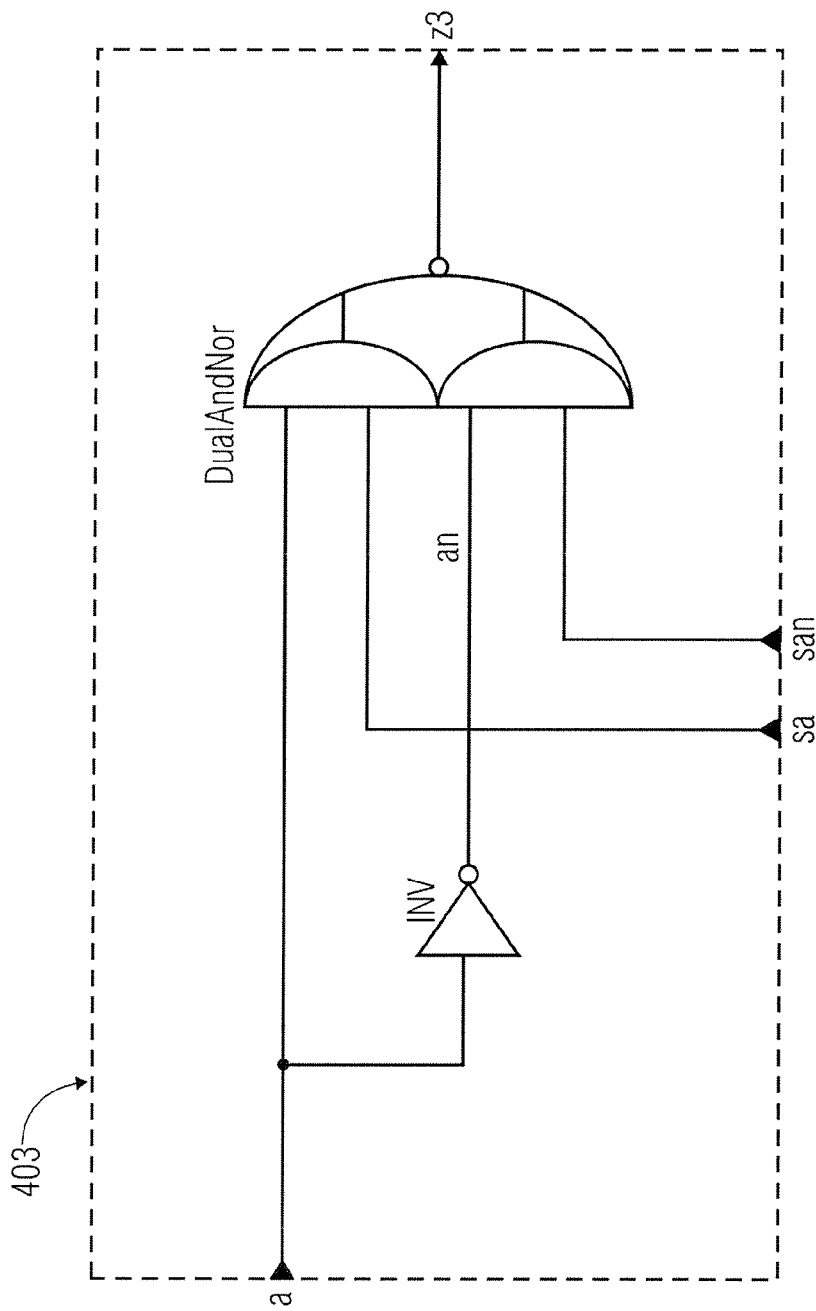
FIG. 5a shows a circuit diagram of a an input data multiplexer module according to an embodiment of the invention.

FIG. 5a shows a circuit diagram of an input data multiplexer (IDM) module according to an embodiment of the invention. The IDM module corresponds to the third IDM module 403 corresponding to the embodiment of the invention as depicted in FIG. 4. The third IDM module 403 comprises a DualAndNor gate "DualAndNor" and an inverter "INV". The DualAndNor gate "DualAndNor" has four inputs, the first input receiving the 1 bit wide third bit-slice input value "a" as depicted in FIG. 4, the second input receiving the fifth signal component "sa" of the third control signal corresponding to the third control signal as depicted in FIG. 4, the third input receiving an output signal "an" of the inverter "INV" which corresponds to the inverted third bit-slice input value "a" corresponding to the third bit-slice input value "a" as depicted in FIG. 4, and the fourth input receiving the sixth signal component "san" of the third control signal corresponding to the third control signal as depicted in FIG. 4. The DualAndNor gate "DualAndNor" has one output for providing the third IDM output value "z3" corresponding to the third IDM output value "z3" as depicted in FIG. 4. The third IDM output value "z3" is an output of the DualAndNor gate "DualAndNor" and also an output of the third IDM module 403.

The inverter "INV" is configured to invert the third bit-slice input value "a" to an inverted third bit-slice input value "an". The third bit-slice input value "a" is an input to the inverter "INV", to the DualAndNor gate "DualAndNor" and also to the third IDM module 403. The fifth and sixth signal components of the third IDC control signal (sa, san) are inputs to the DualAndNor gate "DualAndNor" and also inputs to the third IDM module 403.

The DualAndNor gate "DualAndNor" combines the first and second input via a logical AND combination, the third and fourth input via a logical AND combination and the resulting outputs of both logical AND combinations by a logical NOR combination.

The result of the DualAndNor combination provided by the DualAndNor gate "DualAndNor" is $$z3 = \text{NOT}(a \cdot sa + \text{not}(a) \cdot san),$$

i.e., depending on the fifth and sixth signal components of the third control signal "sa" and "san", the following applies:

$z3=1$ (for sa=0, san=0), $z3=a$ (for sa=0, san=1), $z3=\text{not}(a)$ (for sa=1, san=0), $z3=0$ (for sa=1, san=1).

The first IDM module 401 and the second IDM module 402 have a similar design as the third IDM module 403, however different bit-slice input values and different IDC control signals are applied and different IDM output values are provided corresponding to the embodiment of the invention as depicted in FIG. 4.

Figure 5B:
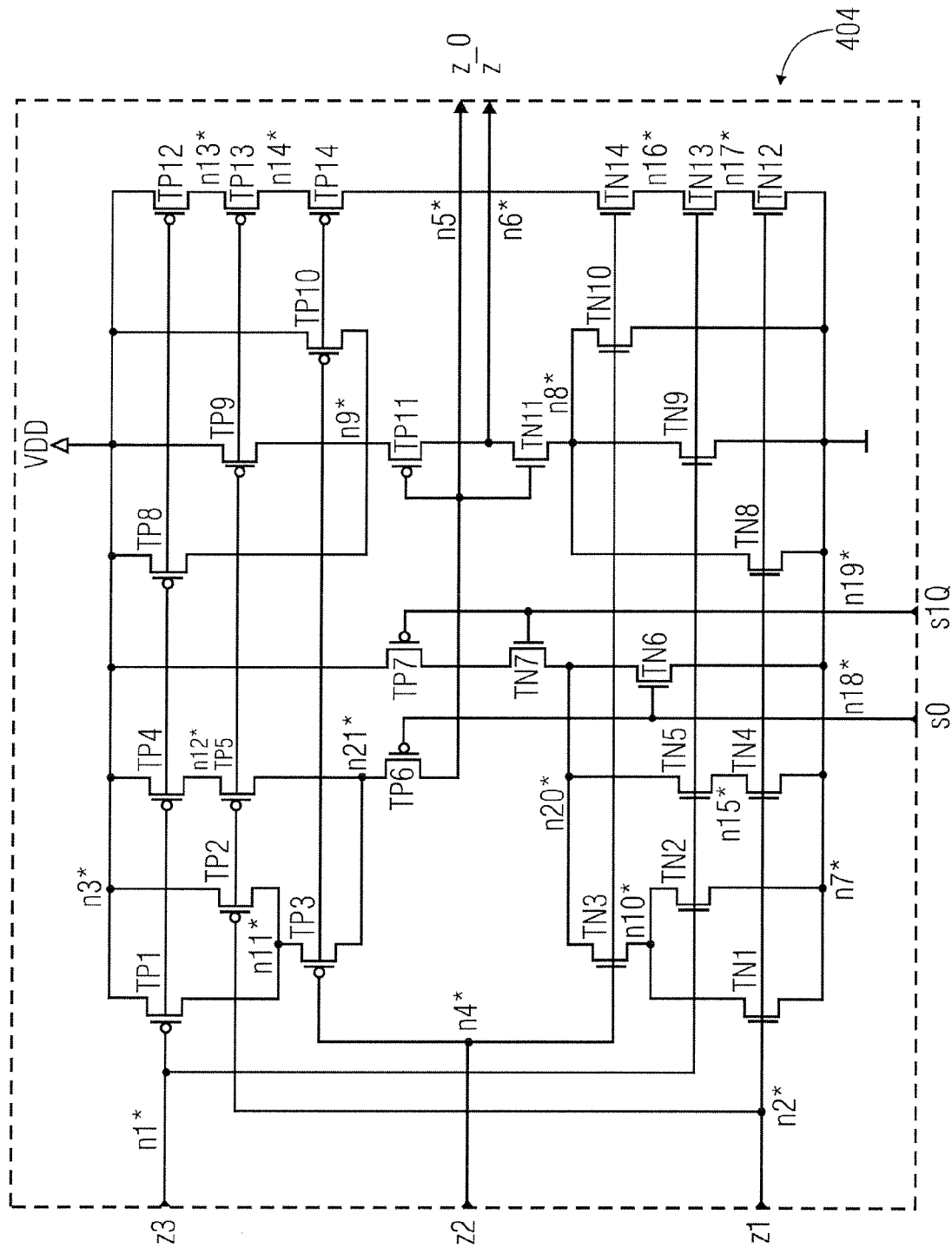
FIG. 5b shows a circuit diagram of a data format conversion module based on a generalization of a mirror adder implementation of a full adder according to an embodiment of the invention.

FIG. 5b shows a circuit diagram of a data format conversion module based on a generalization of a mirror adder implementation of a full adder according to an embodiment of the invention. The data format conversion module (DFC) corresponds to the data format conversion (DFC) module as depicted in FIG. 4. The DFC module 404 has five inputs, a first input for receiving the 1 bit wide first IDM output value z1 corresponding to the first IDM output value z1 as depicted in FIG. 4, a second input for receiving the 1 bit wide second IDM output value z2 corresponding to the second IDM output value z2 as depicted in FIG. 4, a third input for receiving the 1 bit wide third IDM output value z3 corresponding to the third IDM output value z3 as depicted in FIG. 4 and FIG. 5.a, a forth input for receiving the seventh signal component of the third control signal s0 and a fifth input for receiving the eighth signal component of the third control signal s1Q. The DFC module 404 has two outputs, a first output z for providing the converted bit-slice input value z corresponding to the converted bit-slice input value z as depicted in FIG. 4 and a second output for providing the additional bit-slice carry output value z_o corresponding to the bit-slice output additional carry value z_o as depicted in FIG. 4.

The DFC module 404 comprises 14 PMOS transistors TP1-TP14 and 14 NMOS transistors TN1-TN14. Each of the transistors comprise a gate terminal, a first channel terminal and a second channel terminal. The DFC module 404 can be described by its twenty-one internal nodes n1*-n21*.

The first internal node n1* is connected to the third input receiving the third IDM output value z3 and connected to the gate terminals of TN2, TN5, TN9, TN13, TP1, TP4, TP8 and TP12.

The second internal node n2* is connected to the first input receiving the first IDM output value z1 and connected to the gate terminals of TN1, TN4, TN8, TN12, TP2, TP5, TP9 and TP13.

The third internal node n3* is connected to a positive supply voltage VDD and to the first channel terminals of TP1, TP2, TP4, TP8, TP9, TP10, TP7 and TP12.

The forth internal node n4* is connected to the second input receiving the second IDM output value z2 and connected to the gate terminals of TP3, TP10, TP14, TN3, TN10 and TN14.

The fifth internal node n5* is connected to the second output for providing the additional bit-slice carry output value z_o, connected to the gate terminals of TP11 and TN11, connected to the first channel terminal of TN7 and connected to the second channel terminals of TP6 and TP7.

The sixth internal node n6* is connected to the first output for providing the converted bit-slice input value z, connected to the first channel terminals of TN11 and TN14 and connected to the second channel terminals of TP11 and TP14.

The seventh internal node n7* is connected to a reference ground potential and connected to the second channel terminals of TN1, TN2, TN4, TN8, TN9, TN10, TN12 and TN6.

The eighth internal node n8* is connected to the first channel terminals of TN8, TN9, TN10 and connected to the second channel terminal of TN11.

The ninth internal node n9* is connected to the first channel terminal of TP11 and connected to the second channel terminals of TP8, TP9, TP10.

The tenth internal node n10* is connected to the first channel terminals of TN1, TN2 and connected to the second channel terminal of TN3.

The eleventh internal node n11* is connected to the first channel terminal of TP3 and connected to the second channel terminals of TP1, TP2.

The twelfth internal node n12* is connected to the first channel terminal of TP5 and connected to the second channel terminal of TP4.

The thirteenth internal node n13* is connected to the first channel terminal of TP13 and connected to the second channel terminal of TP12.

The fourteenth internal node n14* is connected to the first channel terminal of TP14 and connected to the second channel terminal of TP13.

The fifteenth internal node n15* is connected to the first channel terminal of TN4 and connected to the second channel terminal of TN5.

The sixteenth internal node n16* is connected to the first channel terminal of TN13 and connected to the second channel terminal of TN14.

The seventeenth internal node n17* is connected to the first channel terminal of TN12 and connected to the second channel terminal of TN13.

The eighteenth internal node n18* is connected to the forth input for receiving the seventh signal component of the third control signal s0 and connected to the gate terminals of TN6 and TP6.

The nineteenth internal node n19* is connected to the fifth input for receiving the eighth signal component of the third control signal s1Q and connected to the gate terminals of TN7 and TP7.

The twentieth internal node n20* is connected to the first channel terminals of TN3, TN5 and TN6 and connected to the second channel terminal of TN7.

The twenty-first internal node n21* is connected to the first channel terminal of TP6 and connected to the second channel terminals of TP3 and TP5.

The DFC module 404 is adapted to realize the following functions depending on the seventh signal component s0 and the eighth signal component s1Q of the third control signal.

For s0=0, s1Q=1:

$z=\text{NOT}(z3 \oplus z2 \oplus z1)$, $z\_o=\text{NOT}(z3 \cdot z2+z2 \cdot z1+z1 \cdot z3)$.

For s0=1, s1Q=1:

$z=\text{NOT}(z3 \cdot z2 \cdot z1)$, $z\_o=0$.

For s1Q=0:

$z=\text{NOT}(z3+z2+z1)$, $z\_o=1$.

z represents the converted bit-slice input value and z_o represents the bit-slice output additional carry value corresponding to the embodiment of the invention as depicted in FIG. 4.

Figure 6:
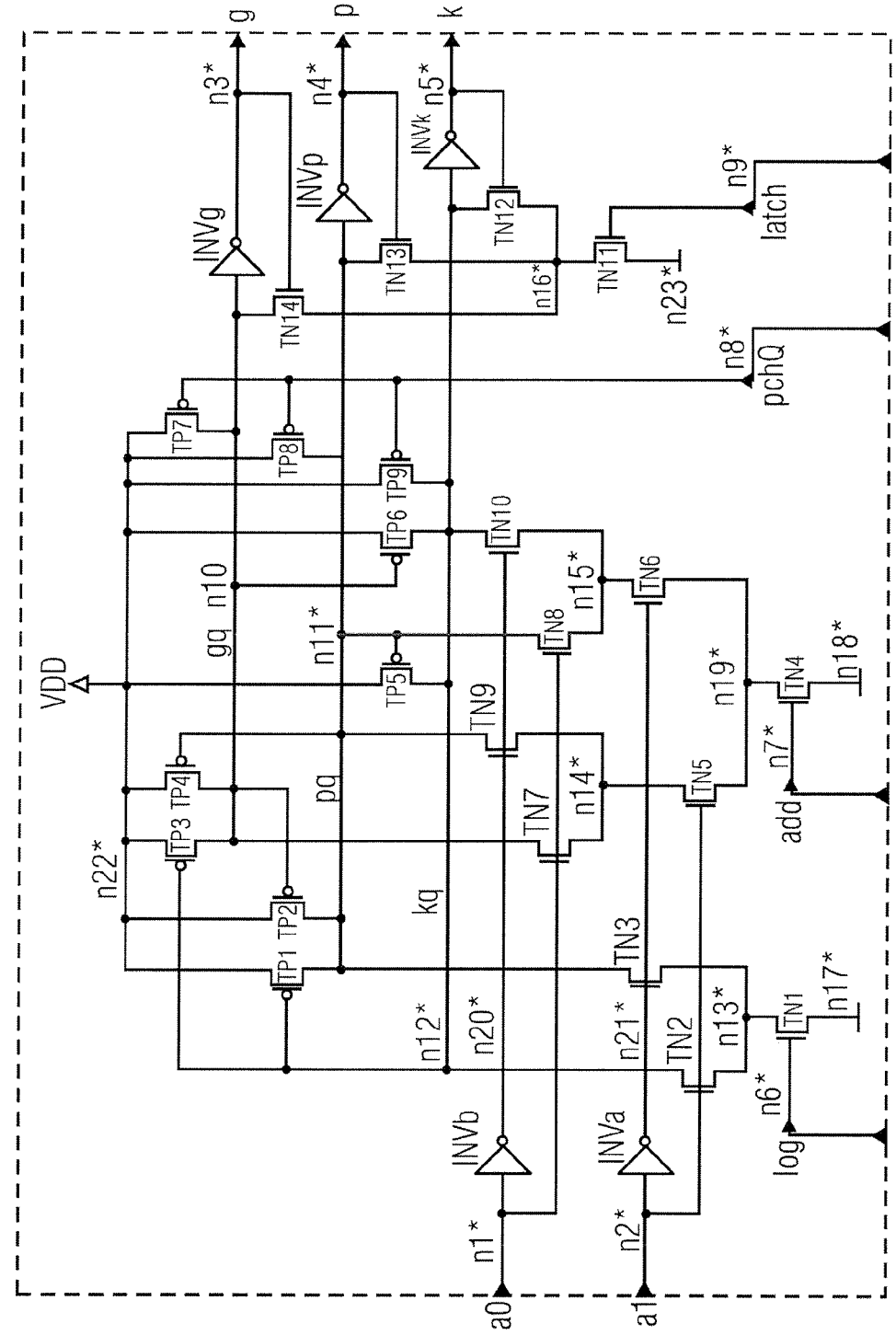
FIG. 6 shows a circuit diagram of a GPK latch module according to an embodiment of the invention.

FIG. 6 shows a circuit diagram of a GPK latch module according to an embodiment of the invention. The GPK latch module 302 has a first input for receiving the first GPK input value a0, a second input for receiving the second GPK input value a1 corresponding to the GPK input values as depicted in FIG. 4. The GPK latch module 302 has a third input for receiving the "log" signal component "log" of the first control signal, a fourth input for receiving the "add" signal component add of the first control signal, a fifth input for receiving the precharge signal component "pchQ" of the first control signal and a sixth input for receiving the "latch" signal component latch of the first control signal. The GPK latch module 302 has a first output for providing the Generate-signal g, a second output for providing the Propagate-signal p and a third output for providing the Kill-signal k. Input and output signals correspond to input and output signals of the GPK latch module 302 as depicted in FIG. 4.

The GPK latch module 302 comprises nine PMOS transistors TP1-9, 14 NMOS transistors TN1-14 and five inverters INVa,b,g,p,k. Each of the transistors comprise a gate terminal, a first channel terminal and a second channel terminal. Each of the inverters comprise an input and an output. The GPK latch module 302 can be described by its twenty-three internal nodes n1*-n23*.

The first internal node n1* is connected to the first input for receiving the first GPK input value a0, connected to the input of INVb and connected to the gate terminals of TN7, TN8.

The second internal node n2* is connected to the second input for receiving the second GPK input value a1, connected to the input of INVa and connected to the gate terminals of TN2, TN5.

The third internal node n3* is connected to the first output for providing the Generate-signal g, connected to the output of INVg and connected to the gate terminal of TN14.

The forth internal node n4* is connected to the second output for providing the Propagate-signal p, connected to the output of INVp and connected to the gate terminal of TN13.

The fifth internal node n5* is connected to the third output for providing the Kill-signal k, connected to the output of INVk and connected to the gate terminal of TN12.

The sixth internal node n6* is connected to the third input for receiving the "log" signal component "log" of the first control signal and connected to the gate terminal of TN1.

The seventh internal node n7* is connected to the forth input for receiving the "add" signal component "add" of the first control signal and connected to the gate terminal of TN4.

The eighth internal node n8* is connected to the fifth input for receiving the "pchQ" signal component "pchQ" of the first control signal and connected to the gate terminals of TP7, TP8, TP9.

The ninth internal node n9* is connected to the sixth input for receiving the "latch" signal component "latch" of the first control signal and connected to the gate terminal of TN11.

The tenth internal node n10* carries the inverse gq of the Generate-signal g and is connected to the input of INVg, connected to the gate terminals of TP2, TP6, connected to the first channel terminals of TN14, TN7 and connected to the second channel terminals of TP3, TP4, TP7.

The eleventh internal node n11* carries the inverse pq of the Propagate-signal p and is connected to the input of INVp, connected to the gate terminals of TP4, TP5, connected to the first channel terminals of TN3, TN9, TN13, TN8 and connected to the second channel terminals of TP1, TP2, TP8.

The twelfth internal node n12* carries the inverse kq of the Kill-signal k and is connected to the input of INVk, connected to the gate terminals of TP1, TP3, connected to the first channel terminals of TN2, TN10, TN12 and connected to the second channel terminals of TP5, TP6, TP9.

The thirteenth internal node n13* is connected to the first channel terminal of TN1 and connected to the second channel terminals of TN2, TN3.

The fourteenth internal node n14* is connected to the first channel terminal of TN5 and connected to the second channel terminals of TN7, TN9.

The fifteenth internal node n15* is connected to the first channel terminal of TN6 and connected to the second channel terminals of TN8, TN10.

The sixteenth internal node n16* is connected to the first channel terminal of TN11 and connected to the second channel terminals of TN14, TN13, TN12.

The seventeenth internal node n17* is connected to a ground potential and connected to the second channel terminal of TN1.

The eighteenth internal node n18* is connected to the ground potential and connected to the second channel terminal of TN4.

The nineteenth internal node n19* is connected to the first channel terminal of TN4 and connected to the second channel terminals of TN5, TN6.

The twentieth internal node n20* is connected to the output of INVb and connected to the gate terminals of TN9, TN10.

The twenty-first internal node n21* is connected to the output of INVa and connected to the gate terminals of TN3, TN6.

The twenty-second internal node n22* is connected to a positive reference potential VDD and connected to the first channel terminals of TP1, TP2, TP3, TP4, TP5, TP6, TP7, TP8, TP9.

The twenty-third internal node n23* is connected to the ground potential and connected to the second channel terminal of TN11.

The GPK latch module 302 is adapted to generate, depending on the log signal component "log", the add signal component "add", the precharge signal component "pchQ" and the latch signal component "latch" of the first control signal, from the first GPK input value a0 and the second GPK input value a1, wherein a0 represents the additional bit-slice carry input value from the neighboring less significant bit-slice, the so-called carry generate, carry propagate and carry kill signals (GPK-signals) g, p and k. The GPK latch module 302 is further configured to store the GPK-signals for the duration of the following complete carry ripple and/or carry bypass process. Depending on the first control signal, the log, add, pchQ and latch components, the GPK latch module 302 takes the following states:

"PRECHARGE": for pchQ=0, latch=0, log=0, add=0,

"LOG": for pchQ=1, latch=0, log=1, add=0,

"ADD": for pchQ=1, latch=0, log=0, add=1,

"LATCH": for pchQ=1, latch=1, log=0, add=0.

Here and in the following sections the common equivalents 1 corresponding to VDD and zero corresponding to VSS between the logic states 0 and 1 and the physical levels VSS (mass potential) and VDD (positive supply potential) are used.

In the "PRECHARGE" state the first and second GPK input values a0 and a1 have no influence (because of log=add=0) and also the feedback of the three outputs g, p and k is deactivated by latch=0, so that due to pchQ=0 the nodes gq, pq and kq are connected to VDD via the conductive p-channel transistors TP7-9, therefore the following applies:

gq=pq=kq=1 and g=p=k=0.

In the "LOG" state, the transistors TP7-9 are non-conductive due to pchQ=1, the feedback of the data outputs g, p and k is switched off by latch=0, and due to log=1, add=0, the function g=0, p=a1, k=not(a1) is realized via the second NMOS transistor TN2 and the third NMOS transistor TN3.

In the "ADD" state, the transistors TP7-9 are non-conductive due to pchQ=1, the feedback of the data outputs g, p and k is switched off by latch=0, and due to log=0, add=1, the functions g=a1·a0, p=XOR (a1, a0) and k=NOT (a1+a0) are realized via the transistors TN5-10.

In the "LATCH" state, TP7-9 are non-conductive due to pchQ=1, the data inputs a1 and a0 have no influence due to log=add=0 and the feedback of the data outputs g, p and k is switched on by latch=1, so that the above-established state ("LOG" or "ADD") of g, p and k and of gq, pq and kq is maintained by means of the memory cells formed from TN12-14, TP1-6 and INVg, INVp and INVk for g, p and k and gq, pq and kq to guarantee the following carry ripple and/or carry bypass process implemented in dual-rail circuits.

Figure 7:
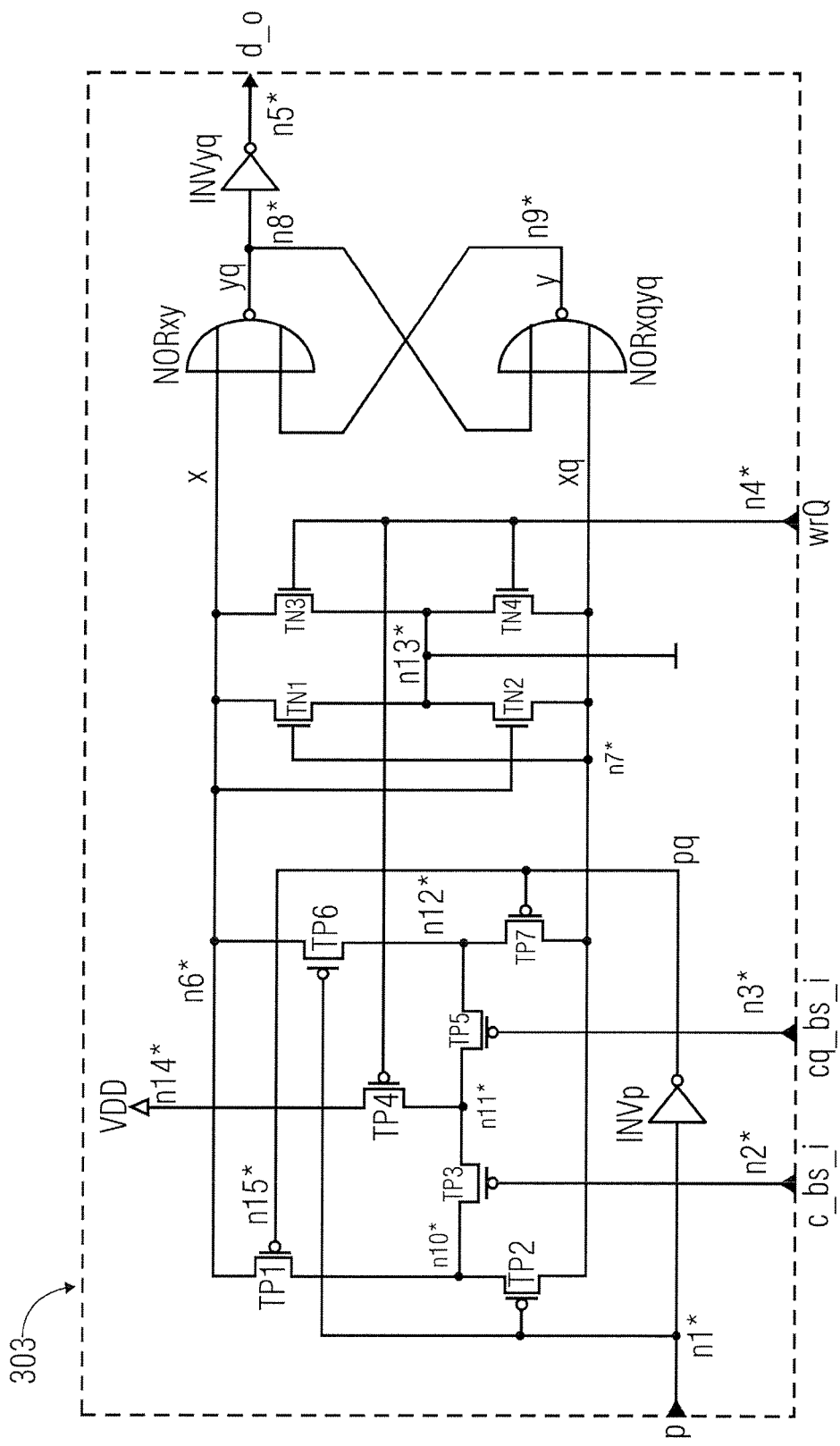
FIG. 7 shows a circuit diagram of an output data XOR latch module according to an embodiment of the invention.

FIG. 7 shows a circuit diagram of an output data XOR latch module according to an embodiment of the invention. The output data XOR latch module 303 comprises seven PMOS transistors TP1-7, four NMOS transistors TN1-4, two inverters INVp, INVyg and two NOR gates NORxy, NORxgyg. Each of the transistors comprise a gate terminal, a first channel terminal and a second channel terminal. Each of the inverters comprises an input and an output. Each of the NOR gates comprises a first input, a second input and an output. The GPK latch module 302 can be described by its fifteen internal nodes n1*-n15*.

The output data XOR latch module 303 comprises four inputs, a first input for receiving the Propagate-signal p corresponding to the Propagate-signal p as depicted in FIG. 6, a second input for receiving the first rail part of the bit-slice input carry value "c_bs_i" corresponding to the first rail part of the bit-slice input carry value "c_bs_i" as depicted in FIG. 4, a third input for receiving the second rail part of the bit-slice input carry value "cq_bs_i" corresponding to the second rail part of the bit-slice input carry value cq_bs_i as depicted in FIG. 4, a fourth input for receiving the second control signal wrQ corresponding to the second control signal wrQ depicted in FIG. 4. The output data XOR latch module 303 further comprises an output for providing the bit-slice output value "d_o" corresponding to the bit-slice output value "d_o" as depicted in FIG. 4.

The output data XOR latch module 303 provides internal values at the internal nodes of the circuit, the internal values are the inverse pq of the Propagate-signal p, the first and second rail parts of the bit-slice sum value (x, xq) and the first and second rail parts of the bit-slice latch value (y, yq).

The first internal node n1* is connected to the first input for receiving the Propagate-signal p, connected to the input of INVp and connected to the gate terminals of TP2, TP6.

The second internal node n2* is connected to the second input for receiving the first rail part of the bit-slice input carry value c_bs_i and connected to the gate terminal of TP3.

The third internal node n3* is connected to the third input for receiving the second rail part of the bit-slice input carry value cq_bs_i and connected to the gate terminal of TP5.

The forth internal node n4* is connected to the forth input for receiving the second control signal wrQ and connected to the gate terminals of TN3, TP4, TN4.

The fifth internal node n5* is connected to the output for providing the bit-slice output value d_o and connected to the output of INVyq.

The sixth internal node n6* carries the first rail part of the bit-slice sum value x and is connected to the first input of NORxy, connected to the gate terminal of TN2 and connected to the first channel terminals of TP1, TP6, TN1, TN3.

The seventh internal node n7* carries the second rail part of the bit-slice sum value xq and is connected to the second input of NORxqyq, connected to the gate terminal of TN1 and connected to the second channel terminals of TP2, TP7, TN2, TN4.

The eighth internal node n8* carries the second rail part of the bit-slice latch value yq and is connected to the first input of NORxqyq, connected to the output of NORxy and connected to the input of INVyq.

The ninth internal node n9* carries the first rail part of the bit-slice latch value y and is connected to the second input of NORxy and connected to the output of NORxqyq.

The tenth internal node n10* is connected to the first channel terminals of TP2, TP3 and connected to the second channel terminal of TP1.

The eleventh internal node n11* is connected to the first channel terminal of TP5 and connected to the second channel terminals of TP3, TP4.

The twelfth internal node n12* is connected to the first channel terminal of TP7 and connected to the second channel terminals of TP5, TP6.

The thirteenth internal node n13* is connected to the first channel terminals of TN2, TN4, connected to the second channel terminals of TN1, TN3 and connected to a reference ground potential.

The fourteenth internal node n14* is connected to the first channel terminal of TP4 and connected to a positive reference potential VDD.

The fifteenth internal node n15* carries the inverse pq of the Propagate-signal p and is connected to the output of INVp and connected to the gate terminals of TP1, TP7.

The output data XOR latch module 303 is adapted, depending on the second control signal wrQ, to calculate the bit-slice output value d_o from the Propagate-signal p representing the carry propagate and the dual-rail bit-slice input carry values (c_bs_i, cq_bs_i) and to store the same.

When the second control signal wrQ is equal to 1, x=xq=0 applies and the RS-Latch formed from the first NOR gate NORxy, the second NOR gate NORxqyq and the first inverter INVyq holds a previously written state (y, yq)=(0, 1) or =(1, 0). When the second control signal wrQ is equal to 0, the precharge or decharge process, respectively, of (x, xq) to (0, 0) is ended, and by the now conductive fourth PMOS transistor TP4 the dual-rail XOR functions $$x=\text{NOT}(p)\cdot\text{NOT}(cq)+\text{NOT}(pq)\cdot\text{NOT}(c),$$

$$xq=\text{NOT}(p)\cdot\text{NOT}(c)+\text{NOT}(pq)\cdot\text{NOT}(cq)$$

realized by the first, second and third PMOS transistors TP1-3 and the fifth to seventh PMOS transistors TP5-7 are enabled.

The transition of the second control signal wrQ from logical 1 to logical 0 only takes place, which is controlled by the control unit, after the carry propagate signal p calculated in the GPK latch module 302 is logically valid, while the bit-slice input carry value (c_bs_i, cq_bs_i) coming from the neighboring less significant bit-slice adder 111-114 or from the carry bypass module 201 as depicted in FIG. 2 may either still be in the precharge state (1, 1) or also already logically valid, i.e. (0, 1) or (1, 0). Thus, by the output data XOR latch module 303 a so-called self-clocking is guaranteed: in the case of (c_bs_i, cq_bs_i)=(1, 1) during the transition of the second control signal wrQ from logical 1 to logical 0, the above-indicated dual-rail XOR functions remain inactive until the bit-slice input carry value (c_bs_i, cq_bs_i) becomes logically valid, i.e. (complementary) (0, 1) or (1, 0), i.e. only when the logical validity of (c_bs_i, cq_bs_i) is given, the bit-slice sum value (x, xq) may also leave its precharge state (0, 0) and overwrite the RS-Latch formed from the NOR gate NORxy, the NOR gate NORxqyq and the inverter INVyq. This again means that the bit-slice sum value (x, xq) becomes logically valid exactly once per clock and/or calculating process, while the bit-slice latch value (y, yq) and the bit-slice output value d_o change their state at most once per clock.

Figure 8:
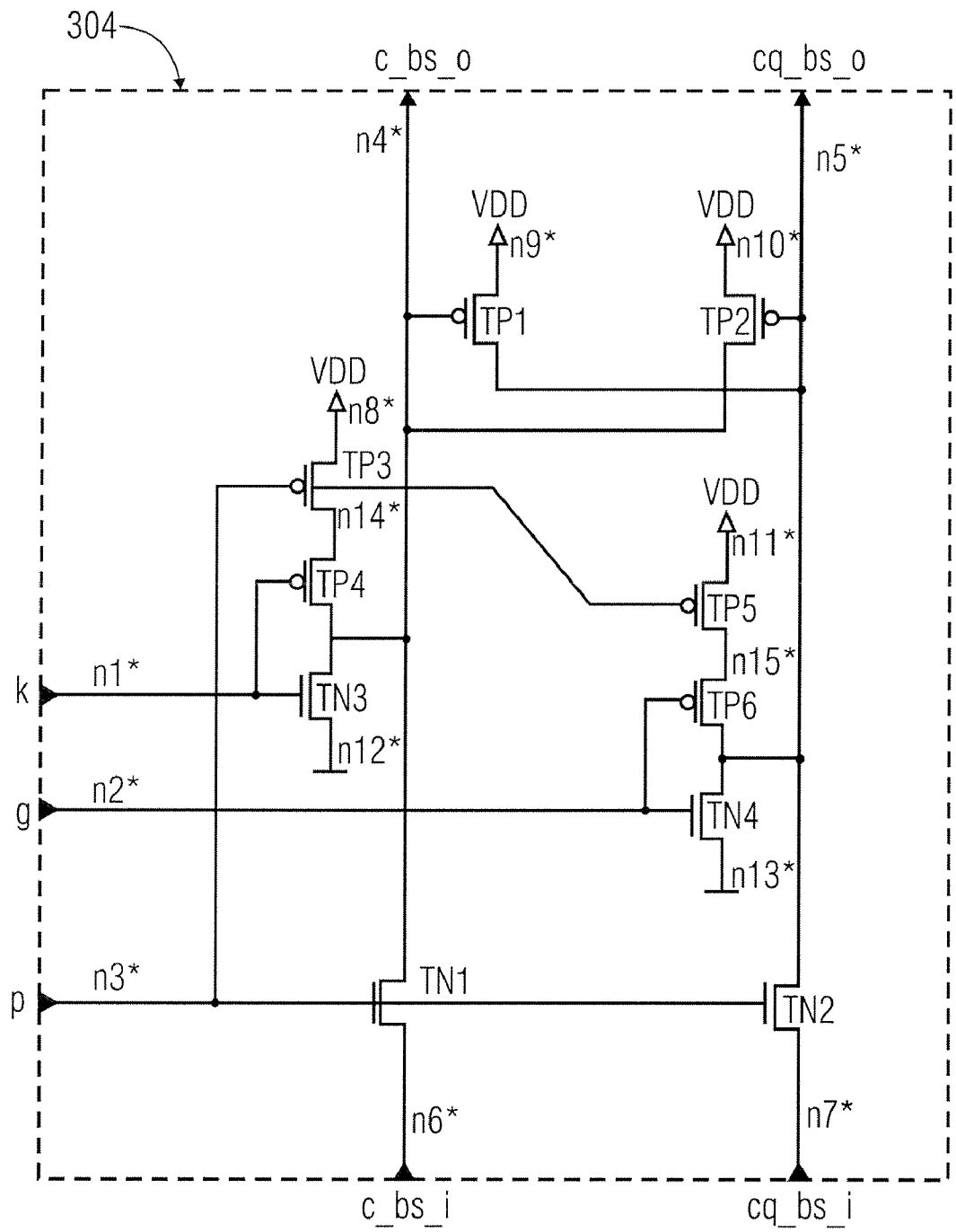
FIG. 8 shows a circuit diagram of a carry path module according to an embodiment of the invention.

FIG. 8 shows a circuit diagram of a carry path module according to an embodiment of the invention. The carry path module 304 comprises a first input for receiving the Kill-signal k, a second input for receiving the Generate-signal g, a third input for receiving the Propagate-signal p which correspond to the GPK-signals as depicted in FIG. 6. The carry path module 304 comprises a fourth input for receiving the first rail part of the bit-slice input carry c_bs_i and a fifth input for receiving the second rail part of the bit-slice input carry cq_bs_i which correspond to the bit-slice input carry (c_bs_i, cq_bs_i) as depicted in FIG. 4. The carry path module 304 comprises a first output for providing the first rail part of the bit-slice output carry c_bs_o and comprises a second output for providing the second rail part of the bit-slice output carry cq_bs_o. The carry path module 304 comprises six PMOS transistors TP1-6 and four NMOS transistors TN1-4.

Each of the transistors comprise a gate terminal, a first channel terminal and a second channel terminal. Each of the inverters comprises an input and an output. The carry path module 304 can be described by its fifteen internal nodes n1*-n15*.

The first internal node n1* is connected to the first input for receiving the Kill-signal k and connected to the gate terminals of TP4, TN3.

The second internal node n2* is connected to the second input for receiving the Generate-signal g and connected to the gate terminals of TP6, TN4.

The third internal node n3* is connected to the third input for receiving the Propagate-signal p and connected to the gate terminals of TN1, TN2, TP3, TP5.

The forth internal node n4* is connected to the first output for providing the first rail part of the bit-slice output carry c_bs_o, connected to the gate terminal of TP1, connected to the first channel terminals of TN1, TN3 and connected to the second channel terminals of TP2, TP4.

The fifth internal node n5* is connected to the second output for providing the second rail part of the bit-slice output carry cq_bs_o, connected to the gate terminal of TP2, connected to the first channel terminals of TN4, TN2 and connected to the second channel terminals of TP1, TP6.

The sixth internal node n6* is connected to the forth input for receiving the first rail part of the bit-slice input carry c_bs_i and connected to the second channel terminal of TN1.

The seventh internal node n7* is connected to the fifth input for receiving the second rail part of the bit-slice input carry cq_bs_i and connected to the second channel terminal of TN2.

The eighth internal node n8* is connected to the first channel terminal of TP3 and connected to a positive supply voltage VDD.

The ninth internal node n9* is connected to the first channel terminal of TP1 and connected to the positive supply voltage VDD.

The tenth internal node n10* is connected to the first channel terminal of TP2 and connected to the positive supply voltage VDD.

The eleventh internal node n11* is connected to the first channel terminal of TP5 and connected to the positive supply voltage VDD.

The twelfth internal node n12* is connected to the second channel terminal of TN3 and connected to a ground reference potential.

The thirteenth internal node n13* is connected to the second channel terminal of TN4 and connected to the ground reference potential.

The fourteenth internal node n14* is connected to the second channel terminal of TP3 and connected to the first channel terminal of TP4.

The fifteenth internal node n15* is connected to the second channel terminal of TP5 and connected to the first channel terminal of TP6.

The carry path module 304 is adapted to determine the bit-slice output carry (c_bs_o, cq_bs_o) from the bit-slice input carry (c_bs_i, cq_bs_i) and from the GPK-signals g, p, k. In the above-described state "PRECHARGE", first of all g=p=k=0 applies and therefore the bit-slice output carry (c_bs_o, cq_bs_o)=(1, 1), while the bit-slice input carry (c_bs_i, cq_bs_i) is isolated from the rest of the circuit due to the Propagate-signal p being equal to 0. As however, the bit-slice input carry (c_bs_i, cq_bs_i) either comes from the next less-significant bit-slice adder 111-114 or from the carry bypass module 201 as depicted in FIG. 2, also the bit-slice input carry (c_bs_i, cq_bs_i)=(1, 1) applies during the "PRECHARGE" state.

As soon as the GPK-signals g, p, k become logically valid during the state "LOG" or the state "ADD" and the state "LATCH", i.e. (g, p, k)=(0, 0, 1), (0, 1, 0) or (1, 0, 0), the following cases may occur: for "carry kill", i.e. (g, p, k)=(0, 0, 1), (c_bs_o, cq_bs_o)=(0, 1) becomes independent of (c_bs_i, cq_bs_i) due to p=0; for "carry generate", i.e. (g, p, k)=(1, 0, 0), (c_bs_o, cq_bs_o)=(1, 0) becomes independent of (c_bs_i, cq_bs_i) due to p=0; for "carry propagate", i.e. (g, p, k)=(0, 1, 0), (c_bs_o, cq_bs_o)=(c_bs_i, cq_bs_i) due to p=1.

Figure 9:
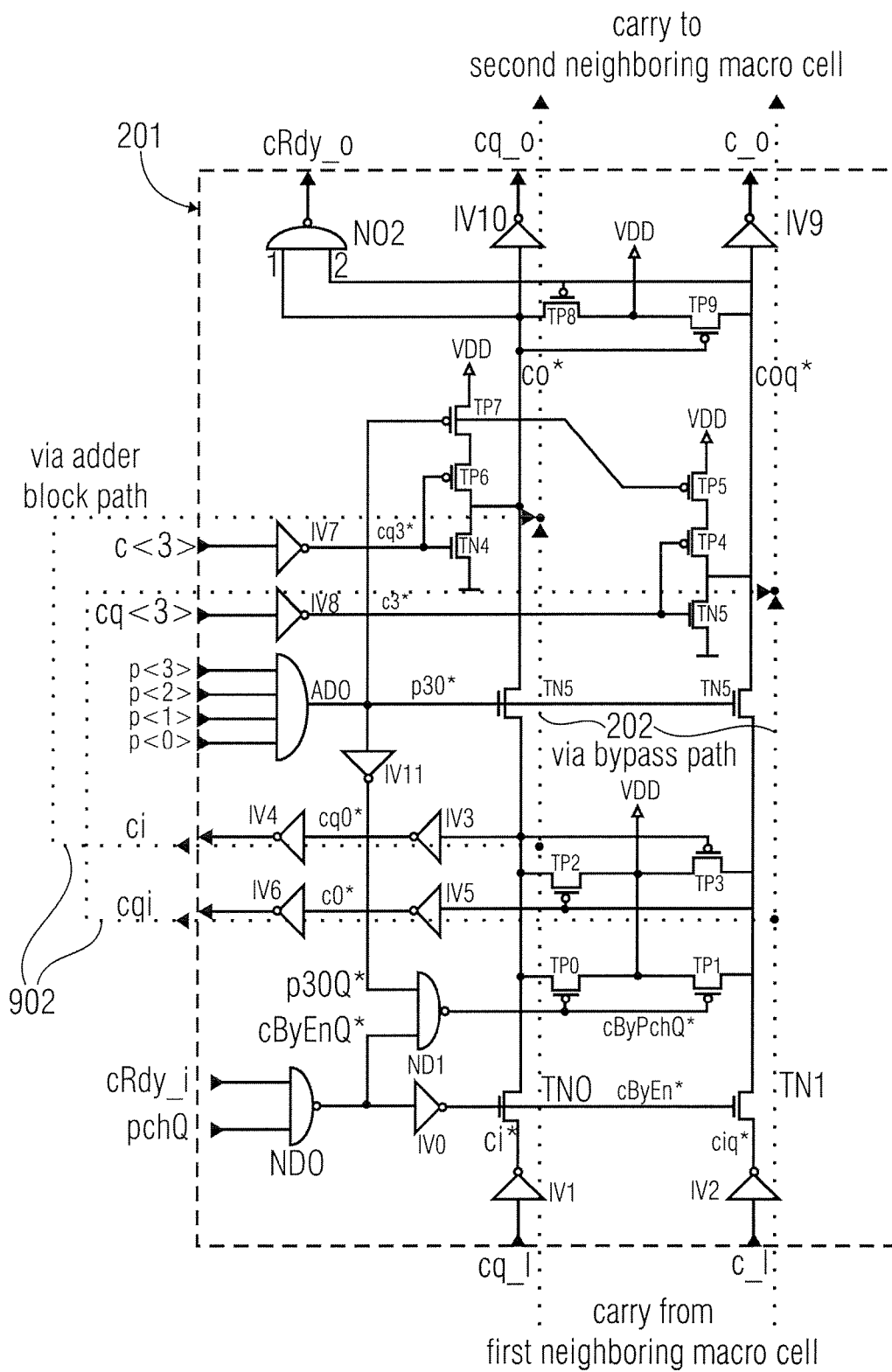
FIG. 9 shows a circuit diagram of a carry bypass module according to an embodiment of the invention.

FIG. 9 shows a circuit diagram of a carry bypass module according to an embodiment of the invention. The carry bypass module 201 corresponds to the carry bypass module 201 as depicted in FIG. 2. The carry bypass module 201 comprises ten inputs, five outputs, one AND gate "AD0" for performing a logical AND operation, three NAND gates "ND0", "ND1", "ND2" for performing the logical NAND operation, twelve inverters "IV0-11", ten PMOS transistors TP0-9 and six NMOS transistors "TN0-5".

Each of the transistors comprises a gate terminal, a first channel terminal and a second channel terminal. Each of the inverters comprises an input and an output. Each of the NAND gates comprises a first input, a second input and an output. The AND gate comprises a first, second, third and forth input and an output. The carry path module 304 can be described by its inputs c<3>, cq<3>, p<3>, p<2>, p<1>, p<0>, cRdy_i, pchQ, cq_i, c_i, outputs ci, cqi, cRdy_o, cq_o, c_o, internal nodes co*, coq*, cq3*, c3*, p30*, c*, cq*, cq0*, c0*, p30Q*, cByEnQ*, cByPchQ*, cByEn*, ci*, ciq* and reference nodes carrying a positive supply voltage VDD and a ground reference potential.

The carry bypass module 201 comprises a first input for receiving the first rail part of the carry output c<3> corresponding to the first rail part of the carry output c<3> as depicted in FIG. 2.

The carry bypass module 201 comprises a second input for receiving the second rail part of the carry output cq<3> corresponding to the second rail part of the carry output cq<3> as depicted in FIG. 2. The carry bypass module 201 comprises a third input for receiving the fourth Propagate-signal p<3> corresponding to the fourth Propagate-signal p<3> as depicted in FIG. 2.

The carry bypass module 201 comprises a fourth input for receiving the third Propagate-signal p<2> corresponding to the third Propagate-signal p<2> as depicted in FIG. 2. The carry bypass module comprises a fifth input for receiving the second Propagate-signal p<1> corresponding to the second Propagate-signal p<1> as depicted in FIG. 2. The carry bypass module 201 comprises a sixth input for receiving the first Propagate-signal p<0> corresponding to the first Propagate-signal p<0> as depicted in FIG. 2.

The carry bypass module 201 comprises a seventh input for receiving the validity signal of the first neighboring macrocell "cRdy_i" which may be included in the carry bypass control signal ctrl_cb as depicted in FIG. 2. The carry bypass module 201 comprises an eighth input for receiving a precharge signal component "pchQ" of the first control signal "ctrl_gpk" corresponding to the precharge signal component "pchQ" of the first control signal "ctrl_gpk" as depicted in FIG. 4 and included in the carry bypass control signal "ctrl_cb" as depicted in FIG. 2.

The carry bypass module 201 comprises a ninth input for receiving the second rail part of the carry of the first neighboring macrocell "cq_i" corresponding to the second rail part of the carry of the first neighboring macrocell "cq_i" as depicted in FIG. 2. The carry bypass module 201 comprises a tenth input for receiving the first rail part of the carry of the first neighboring macrocell "c_i" corresponding to the first rail part of the carry of the first neighboring macrocell "c_i" as depicted in FIG. 2.

The carry bypass module 201 comprises a first output for providing the first rail part of the carry input to the adder block "ci" corresponding to the first rail part of the carry input to the adder block "ci" as depicted in FIG. 2. The carry bypass module 201 comprises a second output for providing the second rail part of the carry input to the adder block "cqi" corresponding to the second rail part of the carry input to the adder block "cqi" as depicted in FIG. 2. The carry bypass module 201 comprises a third output for providing the output validity signal "cRdy_o" corresponding to the output validity signal "cRdy_o" as depicted in FIG. 2. The carry bypass module 201 comprises a fourth output for providing the second rail part of the carry to the second neighboring macrocell "cq_o" corresponding to the second rail part of the carry to the second neighboring macrocell "cq_o" as depicted in FIG. 2. The carry bypass module 201 comprises a fifth output for providing the first rail part of the carry to the second neighboring macrocell "c_o" corresponding to the first rail part of the carry to the second neighboring macrocell "c_o" as depicted in FIG. 2.

The first input for receiving the first rail part of the carry output c<3> is connected to the input of IV7. The second input for receiving the second rail part of the carry output cq<3> is connected to the input of IV8.

The third input for receiving the fourth Propagate-signal p<3> is connected to the first input of AD0. The forth input for receiving the third Propagate-signal p<2> is connected to the second input of AD0. The fifth input for receiving the second Propagate-signal p<1> is connected to the third input of AD0. The sixth input for receiving the first Propagate-signal p<0> is connected to the forth input of AD0.

The seventh input for receiving the validity signal of the first neighboring macrocell cRdy_i is connected to the first input of ND0. The eighth input for receiving the precharge signal component "pchQ" of the first control signal ctrl_gpk is connected to the second input of ND0.

The ninth input for receiving the second rail part of the carry of the first neighboring macrocell cq_i is connected to the input of IV1. The tenth input for receiving the first rail part of the carry of the first neighboring macrocell c_i is connected to the input of IV2.

The first output for providing the first rail part of the carry input to the adder block ci is connected to the output of IV4. The second output for providing the second rail part of the carry input to the adder block cqi is connected to the output of IV6.

The third output for providing the output validity signal cRdy_o is connected to the output of ND2. The fourth output for providing the second rail part of the carry to the second neighboring macrocell cq_o is connected to the output of IV10. The fifth output for providing the first rail part of the carry to the second neighboring macrocell c_o is connected to the output of IV9.

The internal node co* is connected to the input of IV10, connected to the first input of ND2, connected to the gate terminal of TP9, connected to the first channel terminals of TP8, TN4, TN2 and connected to the second channel terminal of TP6.

The internal node coq* is connected to the input of IV9, connected to the second input of ND2, connected to the gate terminal of TP8, connected to the first channel terminals of TN5, TN3 and connected to the second channel terminals of TP9, TP4.

The internal node c* is connected to the input of IV3, connected to the gate terminal of TP3, connected to the first channel terminals of TP2, TP0, TN0 and connected to the second channel terminal of TN2.

The internal node cq* is connected to the input of IV5, connected to the gate terminal of TP2, connected to the first channel terminal of TN1 and connected to the second channel terminals of TP3, TN3, TP1.

The internal node ci* is connected to the output of IV1 and connected to the second channel terminal of TN0.

The internal node ciq* is connected to the output of IV2 and connected to the second channel terminal of TN1.

The internal node cq3* is connected to the output of IV7 and connected to the gate terminals of TN4, TP6.

The internal node c3* is connected to the output of IV8 and connected to the gate terminals of TN5, TP4.

The internal node p30* is connected to the output of AD0, connected to the input of IV11 and connected to the gate terminals of TN2, TN3, TP7, TP5.

The internal node cq0* is connected to the output of IV3 and connected to the input of IV4.

The internal node c0* is connected to the output of IV5 and connected to the input of IV6.

The internal node p30Q* is connected to the output of IV11 and connected to the first input of ND1.

The internal node cByEnQ* is connected to the output of ND0, connected to the input of IV0 and connected to the second input of ND1.

The internal node cByPchQ* is connected to the output of ND1 and connected to the gate terminals of TP0, TP1.

The internal node cByEn* is connected to the output of IV0 and connected to the gate terminals of TN0, TN1.

The reference node carrying the positive supply voltage VDD is connected to the first channel terminals of TP9, TP5, TP7, TP3, TP1 and connected to the second channel terminals of TP8, TP2, TP0.

The reference node carrying the ground reference potential is connected to the second channel terminals of TN5, TN4.

The second channel terminal of TP7 is connected to the first channel terminal of TP6.

The second channel terminal of TP5 is connected to the first channel terminal of TP4.

The carry bypass module 201 is a part of the control unit 102 and is adapted to determine from data depending on the input values data_i of the adder block 101, i.e. from the first, second, third and fourth Propagate-signals p<0>, p<1>, p<2>, p<3>, whether the carry of the first neighboring macrocell (cq_i, c_i) may pass a bypass path to the second neighboring macrocell 20 (via bypass path 202). The control unit 102 is adapted to signal a validity of the carry output of the macrocell 100 to the second neighboring macrocell 20 depending on a logical combination of states of the two carry output lines (cq_o, c_o). The validity is signaled via the output validity signal cRdy_o. The control unit 102 is further adapted, depending on a validity signal (cRdy_i) of the first neighboring macrocell 10 indicating a validity of the carry of the first neighboring macrocell (cq_i, c_i), to prevent forwarding the carry of the first neighboring macrocell (cq_i, c_i) to the bypass path 202 and the adder block 902, respectively. The control unit 102 is further adapted to prevent forwarding the carry of the first neighboring macrocell (cq_i, c_i) depending on the precharge signal component pchQ of the first control signal.

The carry bypass module 201 is adapted to accept as an input a dual-rail carry at its carry inputs (c_i, cq_i), i.e. either another macrocell providing the carry by its output flag signals flags_o and/or carry bits, or from a semi-custom logic, provided from elsewhere.

The carry bypass module 201 is adapted to pass the carry of the first neighboring macrocell (c_i, cq_i) onto the least significant bit-slice adder 111 as carry input to the adder block (ci, cqi) within the respective macrocell 100. The carry bypass module 201 is further adapted to either switch the carry of its neighboring macrocell (c_i, cq_i) to the fifth and fourth outputs of the carry bypass module 201 as carry to the second neighboring macrocell (c_o, cq_o) which may be included in the output flag signals flags_o as depicted in FIG. 1 (in this case of "carry bypass", the carry propagate signals or the Propagate-signals, respectively, p<3>, p<2>, p<1> and p<0> of all four bit-slice adders 111-114 are equal to 1, therefore the internal signal of the carry bypass module 201 p30*=1) and to receive the carry output (c<3>, cq<3>) of the most significant bit-slice adder 114 as depicted in FIG. 2 at its first and second inputs and to output the same via its fourth and fifth output (cq_o, c_o) to the output flag signals flags_o of the macrocell 100 (in this case, the carry propagate signals or the Propagate-signals respectively, p<3>, p<2>, p<1> and p<0> of the four bit-slice adders 111-114 are not necessarily all equal to 1, therefore the internal signal of the carry bypass module 201 p30* may be 0), and to generate the output validity signal cRdy_o for indicating the internal state of the macrocell 100: cRdy_o=0 corresponds to the PRECHARGE state, cRdy_o=1 corresponds to either ADD, LOG or LATCH state. Due to cRdy_o=NOT (co* X coq*), on the one hand it is indicated by cRdy_o=0 that co*=coq*=1, i.e. that (co*, coq*) are in the precharge state "PRECHARGE" (indeed, in the above state "PRECHARGE" described for the partial circuit GPK latch module 302, not only the bit-slice output carries (c_bs_o, cq_bs_o) of the partial circuits carry path module 304 are set into the precharge state (1, 1) in all bit-slice adders 111-114, but via the carry output (c<3>, cq<3>)=(1, 1) and the Propagate-signals p<3>=p<2>=p<1>=p<0>=0 and the internal signal p30*=0, also the internal signal (co*, coq*)=(1,1) within the carry bypass module 201). On the other hand, the output validity signal cRdy_o=1 means that the internal signal (co*, coq*) is logically valid, i.e. either equal (0, 1) or (1, 0).

The signal of the seventh input, the validity signal of the first neighboring macrocell cRdy_i corresponds to the output signal at the third output of the carry bypass module 201 of the first neighboring macrocell 10, representing the output validity signal cRdy_o of the first neighboring macrocell 10, i.e. by the validity signal of the first neighboring macrocell cRdy_i=1 it is signalized to the macrocell 100 by the first neighboring macrocell 10 that its less significant carry outputs (c_o, cq_o) and thus the carry inputs (c_i, cq_i) of the considered macrocell 100 are logically valid, i.e. either equal to (0, 1) or to (1, 0).

The precharge signal component pchQ of the first control signal corresponds to the precharge signal component pchQ of the first control signal as depicted in FIG. 4. From this it results that the carry of the first neighboring macrocell (c_i, cq_i) is only passed on to the internal nodes (c*, cq*) of the carry bypass module 201 with the internal signal cByEn*=1 when pchQ=cRdy_i=1 holds true, i.e. when the macrocell 100 is not in the "PRECHARGE" state and when the carry output from the first neighboring macrocell to the considered macrocell (c_i, cq_i) is logically valid. Accordingly, the precharge of the internal nodes (c*, cq*) of the carry bypass module 201 is only switched off (with the internal node signal cByPchQ=1) when pchQ=cRdy_i=1 (or when the internal signal p30*=1, whereby it is prevented that with p30*=1 the precharge signal cByPchQ* with the falling edge pchQ=1→0 becomes active, i.e. equal 0, too soon, wherein in this case a temporary driver conflict would result between the p-channel transistors controlled by cByPchQ* and the n-channel transistors controlled by c3* and c3q* which are not yet in precharge; Thus, cByPchQ* can only become active when the internal signal p30*=0 and/or after a possible falling edge p30*=1→0, whereby unnecessary energy loss is prevented).

FIG. 10 shows a timing diagram for macrocell signals according to an embodiment of the invention. FIG. 10 shows the timing of the common clock signal clk, the latch signal component "latch" of the first control signal, the precharge signal component "pchQ" of the first control signal, the add/log signal component "add/log" of the first control signal, the second control signal wrQ, the first to fourth input values data_i<>, the IDC/GPK control signal ctrl_idc/gpk (ctrl_gpk corresponds to the first control signal, ctrl_idc corresponds to the third control signal) and the output validity signal cRdy_o. The control unit 102 is adapted to set the latch signal component "latch" of the first control signal to a logical zero responsive to a rising edge of the common clock signal clk, illustrated by a first arrow 1001. FIG. 10 illustrates only the case of a rising clock edge trigger. Another embodiment of the invention comprises a control unit 102 being triggered by a falling clock edge.

The control unit 102 is further adapted to set the pchQ signal component "pchQ" of the first control signal to a logical zero responsive to a falling edge of the latch signal component latch, illustrated by a second arrow 1002. The control unit 102 is further adapted to set the second control signal wrQ to a logical 1 responsive to the rising or falling edge of the common clock signal clk, illustrated by a third arrow 1003. The control unit 102 is further adapted to set the pchQ signal component "pchQ" of the first control signal to a logical 1 responsive to a falling edge of the output validity signal cRdy_o, illustrated by a fourth arrow 1004, is adapted to set the add signal component "add" or the log signal component "log" of the first control signal to a logical 1 responsive to the setting of the pchQ signal component "pchQ" to the logical 1, illustrated by a fifth arrow 1005, is adapted to set the latch signal component "latch" of the first control signal to a logical 1 responsive to the setting of the add signal component "add" or the log signal component "log" to the logical 1, as illustrated by a sixth arrow 1006, and is adapted to set the add signal component "add" or the log signal component "log" of the first control signal to a logical 0 responsive to the setting of the latch signal component "latch" to the logical 1, as illustrated by a seventh arrow 1007.

The control unit 102 is further adapted to set the second control signal wrQ to a logical 0 responsive to the next edge after the rising edge of the common clock signal clk, illustrated by an eighth arrow 1008. The adder block 101 is fed with a next sequence of input values data_i by an external circuitry between the falling and the next rising edge of the common clock signal clk, as illustrated by a ninth arrow 1009. The feeding of the adder block 101 with input values is not controlled by the control unit 102. The external circuitry needs a synchronization with the common clock signal clk to guarantee a synchronized feeding of the adder block. Also the third control signal ctrl_idc and the first control signal ctrl_gpk may be changed by the external circuitry synchronized with the feeding of the adder block 101 with new input values data_i, as illustrated by the tenth arrow 1010.

The setting of the output validity signal cRdy_o from logical 1 to logical 0 depends on the internal state transitions of the macrocell 100, as described in the above section corresponding to the description of FIG. 9, and finally leads to the transition from logical 1 to logical 0, as illustrated by an eleventh arrow 1011. Also the related transition of the output validity signal cRdy_o from a logical 0 to a logical 1, illustrated by a twelfth arrow 1012, depends on the internal transitions of the macrocell 100 and is therefore not directly depending on the common clock signal clk. The arrows 1011 and 1012 referring to the state transitions of the output validity signal cRdy_o illustrate the asynchronous inter and intra macrocell self-clocking of the macrocell 100 resulting in the advantages mentioned above, regarding silicon area, processing time and energy consumption as well as mastery and design effort.

Prior to the rising edge clk=0→1 of the clock signal clk (supplied from the outside), the macrocell 100 is in the state "LATCH", and the following applies: pchQ=1, latch=1, log=0, add=0.

With clk=0→1, in the control unit 102 two actions are triggered: a falling edge of signal latch=1→0 and a rising edge wrQ=0→1, whereby on the one hand the latch function in the GPK latch module 302 is switched off, in order to then set the RS latch in the output data XOR latch module 303 to its hold mode.

From latch=1→0 a falling edge pchQ=1→0 is derived, whereby the macrocell 100 is set to the state "PRECHARGE" and the following applies: pchQ=0, latch=0, log=0, add=0. As already described above, in the description of FIG. 9, this finally leads to cRdy_o=0, which causes the control unit 102 to generate a rising edge pchQ=0→1 and directly afterwards either trigger log=0→1 or add=0→1, whereby the macrocell 100 is either set to "LOG" or in "ADD" and the following applies: pchQ=1, latch=0, log=1, add=0 or pchQ=1, latch=0, log=0, add=1. From each of those rising edges now with latch=0→1, the latch feedback in the GPK latch module 302 is switched on again, whereupon the falling edge log=1→0 or add=1→0 is derived from latch=0→1. Thus, the macrocell 100 is set to the state "LATCH" and the following applies: pchQ=1, latch=1, log=0, add=0.

Three further temporal dependencies are illustrated in FIG. 10: on the one hand, log/add=1→0 indicates the starting time for the logical/arithmetical operations in the macrocells, i.e. depending on the applied operands, sooner or later cRdy_o=0→1, whereby to the respective next more significant macrocell, i.e. the second neighboring macrocell 20, the logical validity of the carry outputs is indicated by the output flag signals flags_o and/or the carry output of the macrocell to the second neighboring macrocell (c_o, cq_o); second, from clk=1→0 the falling edge wrQ=1→0 is derived, i.e. the XOR and RS latch functions in the output data XOR latch module 303 are activated, and finally also the precondition is indicated that the data and control signals data_i and ctrl_idc/gpk coming from outside the macrocells may change their values after the falling edge clk=1→0, the values valid for the following operation, however, have to be taken on at the latest at the also indicated negative setup time $t_{setup}$ relative to clk=0→1.

The least significant macrocell is the only macrocell which has its carry input by the input flag signal flags_i or by (c_i, cq_i) not supplied from a less significant macrocell but from elsewhere, i.e. from a semi-custom environment. In order to guarantee its correct time performance, pchQ may be provided via suitable driver stages as one of the output control signals ctrl_o to this semi-custom environment as an inverted clock signal for semi-custom latches, whose data outputs are connected to the carry inputs, the input flag signals flags_i or (c_i, cq_i), respectively, of the least significant macrocell: thus, (c_i, cq_i) may only change after the input stage described in the description of the carry bypass module 201 according to FIG. 9 is blocked for (c_i, cq_i) due to cByEn*=0 and remains stable as long as pchQ=1.

A method for adding uses an adder block with a plurality of bit-slice adders corresponding to a sequence of consecutive significance bit positions of input values and comprises the steps "receiving a carry associated with lower-significance bit positions in dual-rail coded form", "preventing forwarding the carry associated with lower-significance bit positions depending on a validity associated with the carry associated with lower-significance bit positions", "determining from data depending on the input values whether the carry associated with lower-significance bit positions may enable a bypass path", "outputting a carry associated with lower-significance bit positions by generation within the adder block or by passage of the carry associated with lower-significance bit positions through the bypass path in dual-rail coded form" and "signaling validity of the carry output depending on a dual-rail code of the carry output".

The method for adding is an embodiment of a method for arithmetically-logically processing, wherein the "arithmetically-logically processing" is an "adding". The method for arithmetically-logically processing uses an ALU block with a plurality of bit-slice ALUs corresponding to a sequence of consecutive significance bit positions of input values and comprises the steps "receiving a carry associated with lower-significance bit positions in dual-rail coded form", "preventing forwarding the carry associated with lower-significance bit positions depending on a validity associated with the carry associated with lower-significance bit positions", "determining from data depending on the input values whether the carry associated with lower-significance bit positions may enable a bypass path", "outputting a carry associated with lower-significance bit positions by generation within the ALU block or by passage of the carry associated with lower-significance bit positions through the bypass path in dual-rail coded form" and "signaling validity of the carry output depending on a dual-rail code of the carry output".

A computer program with a program code for performing the methods as described above may be used for running the computer program on a computer.

The invention claimed is:

1. A macrocell, comprising:
an adder block comprising a plurality of bit-slice adders corresponding to a sequence of consecutive significance bit positions of input values;
a bypass path; and
a control unit adapted to receive a carry of a first neighboring macrocell associated with lower-significance bit positions in dual-rail coded form on two carry input lines, and to output a carry by generation within the adder block or by passage of the carry of the first neighboring macrocell through the bypass path, to a second neighboring macrocell associated with higher-significance bit positions in dual-rail coded form on two carry output lines,
wherein the control unit is adapted to determine from data depending on the input values of the adder block whether the carry of the first neighboring macrocell may enable the bypass path to the second neighboring macrocell;
wherein the control unit is adapted to signal a validity of the carry output of the macrocell after a generation thereof within the macrocell or a passage thereof through the macrocell to the second neighboring macrocell depending on a logical combination of states of the two carry output lines; and
wherein the control unit is further adapted, depending on a validity signal of the first neighboring macrocell indicating a validity of the carry of the first neighboring macrocell, to prevent forwarding the carry of the first neighboring macrocell to the bypass path and the adder block, respectively.

2. A macrocell, comprising:
an adder block comprising a plurality of bit-slice adders corresponding to a sequence of consecutive significance bit positions of input values, the bit-slice adders being adapted, depending on one of the input values or intermediate values depending thereon, and a carry of a first neighboring macrocell associated with lower-significance bit positions as processed by bit-slice adders corresponding to lower-significance bit positions during processing of the carry of the first neighboring macrocell through the adder block, to process the carry of the first neighboring macrocell and determine output values and to latch the one of the input values or the intermediate values depending thereon responsive to a first control signal;
a bypass path; and
a control unit being configured to receive the carry of the first neighboring macrocell in dual-rail coded form on two carry input lines, and to output a carry by generation within the adder block or by passage through the bypass path to a second neighboring macrocell associated with higher-significance bit positions in dual-rail coded form on two carry output lines, and to determine from data depending on the input values of the adder block whether the carry of the first neighboring macrocell may pass the bypass path to the second neighboring macrocell, and to enable the first control signal in a predetermined timing relative to a common clock signal common to the first neighboring macrocell and the macrocell, so that the carry of the first neighboring macrocell is accepted as an input for and then forwarded to the adder block during enablement of the first control signal.

3. The macrocell as claimed in claim 2, wherein each of the plurality of bit-slice adders comprises:
a GPK latch module; and
a termination module associated with the GPK latch module,
wherein the GPK latch module is adapted, depending on the one of the input values or the intermediate values depending thereon, to derive Generate, Propagate, Kill (GPK)-signals and to latch the GPK-signals responsive to the first control signal; and
wherein the termination module is adapted, depending on the GPK-signals and the carry of the neighboring next-lower significant bit-slice to determine one of the output values corresponding to significance bit positions of the one of the input values.

4. The macrocell as claimed in claim 3,
wherein each of the plurality of bit-slice adders comprises an input data conversion (IDC) module being adapted, depending on the one of the input values, to provide the one of the intermediate values being input to the GPK latch module and to provide one of additional carry values being input to a GPK latch module of a bit-slice adder corresponding to next higher-significance bit positions of the input values responsive to a third control signal; and
wherein the GPK latch module is adapted, depending on the one of the input values and depending on one of the first neighboring additional carry values associated with an IDC module of a bit-slice adder corresponding to next lower-significance bit positions of the input values, to derive the GPK-signals.

5. The macrocell as claimed in claim 4,
wherein the first control signal comprises a pchQ signal component, a log signal component, an add signal component and a latch signal component; and
wherein the control unit is adapted to set the GPK latch module in a "PRECHARGE" state, in a "LOG" state, in an "ADD" state and in a "LATCH" state by setting the four signal components of the first control signal to logical combinations associated with the four states of the GPK latch module.

6. The macrocell as claimed in claim 5,
wherein the GPK latch module is adapted to set the Generate-, Propagate-, Kill-signals (g, p, k) to a logical 0 in the "PRECHARGE" state;
wherein the GPK latch module is adapted to set the Generate-signal (g) to a logical 0, the Propagate-signal (p) to the one of the input values and the Kill-signal (k) to the inverted one of the input values in the "LOG" state;
wherein the GPK latch module is adapted to set the Generate-signal (g) to a logical AND combination of the one of the input values and the one of the first neighboring additional carry values, to set the Propagate-signal (p) to a logical EXOR-combination of the one of the input values and the one of the first neighboring additional carry values, to set the Kill-signal (k) to a logical NOR-combination of the one of the input values and the one of the first neighboring additional carry values in the "ADD" state; and
wherein the GPK module is adapted to store the Generate-, Propagate-, Kill-signals from the last "LOG" or "ADD" state, the GPK latch module was set to, in the "LATCH" state.

7. The macrocell as claimed in claim 4, wherein the IDC module comprises:
a plurality of input data multiplexer (IDM) modules, each of the IDM modules adapted to multiplex one of the input bits of the one of the input values responsive to the third control signal to provide a plurality of IDM output values, each of the IDM output values associated with one of the IDM modules; and
a data format conversion (DFC) module, adapted to convert the plurality of IDM output values to provide the one of the intermediate values and the one of the additional carry values;
wherein the third control signal comprises a plurality of signal components having a first-rail and a second-rail signal part, each of the signal components associated with one of the IDM modules.

8. The macrocell as claimed in claim 7, wherein each of the IDM modules is adapted to provide one of the plurality of IDM output values by forming a logical NOR combination of two logical AND combinations, the first of the two logical AND combinations combining the one of the input bits of the one of the input values with the first-rail signal part of the signal component of the third control signal associated with each of the IDM modules and the second of the two logical AND combinations combining the inverted one of the input bits of the one of the input values with the second-rail signal part of the signal component of the third control signal associated with the each of the IDM modules.

9. The macrocell as claimed in claim 7, wherein the DFC module is adapted to provide the one of the intermediate values by forming a logical XNOR combination of all values of the plurality of IDM output values; wherein the DFC module is adapted to provide the one of the additional carry values by forming a logical NOR combination of all possible logical AND combinations of two different IDM output values of the plurality of IDM output values.

10. The macrocell as claimed in claim 3, wherein the termination module comprises:
an output data XOR latch module, being configured, depending on the Propagate-signal derived by the GPK latch module associated with the output data XOR latch module and depending on the carry of the first neighboring less significant bit position as processed by bit-slice adders corresponding to lower-significance bit positions of the adder block, to determine a dual-rail coded bit-slice sum value responsive to a second control signal and latch a bit-slice latch value associated with the termination module depending on the bit-slice sum value responsive to a valid code of the carry corresponding to dual-rail coding.

11. The macrocell as claimed in claim 3, wherein the termination module comprises a carry path module, being configured, depending on the GPK-signals, to forward the carry to a next carry path module associated with next higher-significant bit positions of the input values or to absorb the carry; wherein the carry is forwarded, depending on an active Propagate-signal; wherein the carry is absorbed depending on an inactive Propagate-signal.

12. The macrocell as claimed in claim 10, wherein the output data XOR latch module is adapted to determine a first rail part of the bit-slice sum value by forming a logical OR combination of a first and a second logical AND combination, the first logical AND combination combining an inverted first rail part of the Propagate-signal and an inverted second rail part of the carry and the second logical AND combination combining an inverted second rail part of the Propagate-signal and an inverted first rail part of the carry responsive to an active second control signal corresponding to a logical 0;
wherein the output data XOR latch module is adapted to determine a second rail part of the bit-slice sum value by forming a logical OR combination of a third and a fourth logical AND combination, the third logical AND combination combining the inverted first rail part of the Propagate-signal and the inverted first rail part of the carry and the fourth logical AND combination combining the inverted second rail part of the Propagate-signal and the inverted second rail part of the carry responsive to an active second control signal corresponding to a logical 0; and
wherein the output data XOR latch module is adapted to set the first rail part of the bit-slice sum value equal to the second rail part of the bit-slice sum value responsive to an inactive second control signal corresponding to a logical 1.

13. The macrocell as claimed in claim 10, wherein the output data XOR latch module comprises an RS flip-flop, one of the inputs of the RS flip-flop being connected to the first rail part of the bit-slice sum value, the other input of the RS flip-flop being connected to the second rail part of the bit-slice sum value and the output of the RS flip-flop providing a bit-slice output value or inverse value thereof, so as to set or reset the RS flip-flop responsive to a valid dual-rail code of the bit-slice sum value and to latch the bit-slice output value responsive to a non-valid dual-rail code of the bit-slice sum value.

14. The macrocell as claimed in claim 11,
wherein the carry path module is adapted, depending on the Propagate-signal being active, the Kill-signal being inactive and the Generate-signal being inactive, to forward the carry of the first neighboring macrocell to the next carry path module;
wherein the carry path module is adapted, depending on the Propagate-signal being inactive, the Kill-signal being inactive and the Generate-signal being active, to absorb the carry of the first neighboring macrocell, to generate a new carry in dual-rail coded form having an active first rail part and an inactive second rail part and forward the new carry to the next carry path module associated with next higher-significant bit positions of the input values;
wherein the carry path module is adapted, depending on the Propagate-signal being inactive, the Kill-signal being active and the Generate-signal being inactive, to absorb the carry of the first neighboring macrocell, generate a new inverse carry in dual-rail coded form having an inactive first rail part and an active second rail part and forward the new inverse carry to the next carry path module associated with next higher-significant bit positions of the input values; and wherein the carry path module is adapted, depending on the GPK-signals being inactive, to absorb the carry of the first neighboring macrocell, generate an invalid carry in dual-rail coded form having an invalid dual-rail code and forward the invalid carry to the next carry path module associated with the next higher-significant bit positions of the input values.

15. The macrocell as claimed in claim 5, wherein the control unit comprises a carry bypass module, being configured, depending on a pchQ signal component of the first control signal and depending on a validity signal of the first neighboring macrocell indicating a validity of the carry of the first neighboring macrocell, to forward the carry of the first neighboring macrocell to the termination module associated with least significant bit positions of the input values and enable passing the carry of the first neighboring macrocell through the bypass path or prevent forwarding the carry of the first neighboring macrocell to the bypass path and the adder block, respectively.

16. The macrocell as claimed in claim 15,
wherein the carry bypass module is adapted, depending on the Propagate-signals associated with the GPK latch modules, to output a carry of the macrocell by generation within the adder block on the two carry output lines or output the carry of the first neighboring macrocell by passage through the bypass path on the two carry output lines; and wherein the control unit is further adapted, depending on a logical combination of states of the two carry output lines, to signal validity of the carry of the macrocell after a generation thereof within the macrocell to the second neighboring macrocell.

17. The macrocell as claimed in claim 16,
wherein the carry bypass module is configured, depending on an active pchQ signal component of the first control signal and a validity signal of the first neighboring macrocell indicating a validity of the carry of the first neighboring macrocell, to pass the carry of the first neighboring macrocell to the termination module associated with least significant bit positions of the input values and enable passing the carry of the first neighboring macrocell through the bypass path; and wherein the carry bypass module is configured, depending on an active pchQ signal component of the first control signal corresponding to a logical 0 or a validity signal of the first neighboring macrocell indicating an invalidity of the carry of the first neighboring macrocell corresponding to a logical 0, to prevent forwarding the carry of the first neighboring macrocell to the bypass path and the adder block, respectively.

18. The macrocell as claimed in claim 16,
wherein the carry bypass module is configured, depending on active Propagate-signals associated with each of the GPK latch modules of the plurality of bit-slice adders, to output the carry of the first neighboring macrocell after passage of the bypass path on the two carry output lines; and wherein the carry bypass module is configured, depending on at least one of the Propagate-signals associated with each of the GPK latch modules of the plurality of bit-slice adders being inactive, to output the carry of the macrocell by generation within the adder block on the two carry output lines.

19. The macrocell as claimed in claim 16,
wherein the carry bypass module is configured, depending on a logical NAND combination of signals of the two output lines, to signal validity of the carry of the first neighboring macrocell to the second neighboring macrocell; and wherein the carry bypass module comprises an output validity signal being configured to signal the validity of the carry of the first neighboring macrocell.

20. The macrocell as claimed in claim 19,
wherein the control unit is adapted to set the latch signal component of the first control signal to a logical 0 responsive to a rising or falling edge of the common clock signal and adapted to set the pchQ signal component of the first control signal to a logical 0 responsive to a falling edge of the latch signal component; and wherein the control unit is adapted to set the pchQ signal component of the first control signal to a logical 1 responsive to a falling edge of the output validity signal (indicating completeness of the macrocell-internal precharge process) and adapted to set the add signal component or the log signal component of the first control signal to a logical 1 responsive to the setting of the pchQ signal component to the logical 1 and adapted to set the latch signal component of the first control signal to a logical 1 responsive to the setting of the add signal component or the log signal component to the logical 1 and adapted to set the ADD signal component or the log signal component of the first control signal to a logical 0 responsive to the setting of the latch signal component to the logical 1.

21. The macrocell as claimed in claim 12,
wherein the control unit is adapted to set the second control signal to a logical 1 responsive to the rising or falling edge of the common clock signal;

wherein the control unit is adapted to set the second control signal to a logical 0 responsive to the next edge after the rising or falling edge of the common clock signal; and wherein the adder block is fed with a next sequence of input values controlled by an external control and data path logic before the next rising or falling edge of the common clock signal.

22. A three-operands ALU for processing three input values, comprising:
an ALU block comprising:
a plurality of bit-slice ALUs corresponding to a sequence of consecutive significance bit positions of the three input values, each of the bit-slice ALUs comprising:
a three bit format converter being adapted, depending on three input bits associated with a respective one of the significance bit positions, to calculate a half-adder output bit and an additional carry bit, the additional carry bit being input to a bit-slice ALU corresponding to next higher-significance bit positions of the three input values; and
a 2 bits full adder, being adapted, depending on the format converter output bit or intermediate bits depending thereon, depending on an additional carry bit associated with a bit-slice ALU corresponding to the next lower-significance bit position of the three input values and depending on a carry of a first neighboring three-operands ALU associated with lower-significance bit position as processed by bit-slice ALUs corresponding to lower-significance bit positions of the ALU block, to process the carry of the first neighboring three-operands ALU and determine a three-operands ALU output bit and to latch the format converter output bit or the intermediate bits depending thereon responsive to a first control signal;

the ALU block further comprising:

a bypass path; and a control unit being configured to receive the carry of the first neighboring three-operands ALU in dual-rail coded form on two carry input lines, and to output the carry by generation within the ALU block or by passage through the bypass path to a second neighboring three-operands ALU associated with higher-significance bit positions in dual-rail coded form on two carry output lines and to determine from data depending on the three input values of the ALU block whether the carry of the first neighboring three-operands ALU may pass the bypass path to the second neighboring three-operands ALU, and to enable the first control signal in a predetermined timing relative to a common clock signal, common for the first neighboring three-operands ALU and the three-operands ALU, so that the carry of the first neighboring three-operands ALU is accepted as an input for and forwarded to the ALU block during enablement of the first control signal.

23. The three-operands ALU as claimed in claim 22, wherein the control unit is adapted to signal validity of the carry output of the three-operands ALU to the second neighboring three-operands ALU depending on a logical combination of states of the two carry output lines; and wherein the control unit is further adapted, depending on a validity signal of the first neighboring three-operands ALU indicating a validity of the carry output of the first neighboring three-operands ALU, to prevent forwarding the carry output of the first neighboring three-operands ALU to the bypass path and the adder block, respectively.

24. A method for adding using an adder block having a plurality of bit-slice adders corresponding to a sequence of consecutive significance bit positions of input values, comprising:

receiving a carry associated with lower-significance bit positions in dual-rail coded form;

preventing forwarding the carry associated with lower-significance bit positions depending on a validity associated with the carry associated with lower-significance bit positions;

determining from data depending on the input values whether the carry associated with lower-significance bit positions may enable a bypass path;

outputting a carry associated with lower-significance bit positions by generation within the adder block or by passage of the carry associated with lower-significance bit positions through the bypass path in dual-rail coded form; and signaling validity of the carry output depending on a dual-rail code of the carry output.

25. A computer program product having a program code for performing the method as claimed in claim 24, when the computer program runs on a computer.

* * * * *